(12) United States Patent
Saneyoshi et al.

(10) Patent No.: US 11,501,388 B2
(45) Date of Patent: Nov. 15, 2022

(54) PRODUCTION MANAGEMENT APPARATUS, METHOD, AND NON-TRANSITORY MEDIUM

(71) Applicant: NEC Corporation, Tokyo (JP)

(72) Inventors: Eisuke Saneyoshi, Tokyo (JP); Shigeru Koumoto, Tokyo (JP); Akira Shoujiguchi, Tokyo (JP); Rie Iwasaki, Tokyo (JP); Takahiro Toizumi, Tokyo (JP); Ryota Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 818 days.

(21) Appl. No.: 16/344,881

(22) PCT Filed: Oct. 30, 2017

(86) PCT No.: PCT/JP2017/039147
§ 371 (c)(1),
(2) Date: Apr. 25, 2019

(87) PCT Pub. No.: WO2018/079778
PCT Pub. Date: May 3, 2018

(65) Prior Publication Data
US 2020/0058081 A1 Feb. 20, 2020

(30) Foreign Application Priority Data

Oct. 31, 2016 (JP) .............................. JP2016-213628

(51) Int. Cl.
*G06Q 50/04* (2012.01)
*G05B 19/406* (2006.01)
(Continued)

(52) U.S. Cl.
CPC .......... *G06Q 50/04* (2013.01); *G05B 19/406* (2013.01); *G06Q 10/0631* (2013.01); *G06Q 10/20* (2013.01); *G05B 2219/34294* (2013.01)

(58) Field of Classification Search
CPC ........... G06Q 10/00–50/00; G05B 1/00–24/00
(Continued)

(56) References Cited

U.S. PATENT DOCUMENTS 4,888,692 A * 12/1989 Gupta .............. G05B 19/41865
700/96
5,132,920 A * 7/1992 Bellows ................ G06Q 10/06
376/245

(Continued)

FOREIGN PATENT DOCUMENTS

| JP | 2284853 A | 11/1990 |
|---|---|---|
| JP | 2012110220 A | 6/2012 |
| JP | 5999460 B1 | 9/2016 |

OTHER PUBLICATIONS

Tabata, Y., "Reliability and Economy of the System", Manufacturing and Technology, pp. 44-47 (4 pages).
(Continued)

*Primary Examiner* — Alan S Miller
(74) *Attorney, Agent, or Firm* — Sughrue Mion, PLLC

(57) ABSTRACT

There are provided a repair determination section that determines, based on failure information on the facility for manufacturing a product, a repair time required to repair the facility, and a recovery plan creation section that creates a recovery plan in accordance with a predetermined production evaluation indicator, based on the repair time and production information on a line with the failed facility, one or more other facilities, and on one or more other lines.

18 Claims, 28 Drawing Sheets

(51) Int. Cl.
*G06Q 10/06* (2012.01)
*G06Q 10/00* (2012.01)

(58) Field of Classification Search
USPC .............................................. 705/7.11–7.42
See application file for complete search history.

(56) References Cited

U.S. PATENT DOCUMENTS

| | | | | |
|---|---|---|---|---|
| 5,166,874 | A | | 11/1992 | Nomaru et al. |
| 5,195,041 | A | * | 3/1993 | George ................ G06Q 10/06 700/111 |
| 5,253,184 | A | * | 10/1993 | Kleinschnitz ...... G05B 19/0428 714/26 |
| 5,311,562 | A | * | 5/1994 | Palusamy .............. G21C 17/00 60/660 |
| 6,631,305 | B2 | * | 10/2003 | Newmark ........ G05B 19/41805 700/110 |
| 7,212,876 | B2 | * | 5/2007 | Blumenfeld .......... G06Q 10/20 700/99 |
| 7,509,518 | B2 | * | 3/2009 | Bailey ................... G06F 11/008 714/1 |
| 7,627,452 | B2 | * | 12/2009 | Albrecht ............ G05B 23/0283 702/182 |
| 7,707,058 | B2 | * | 4/2010 | Suermondt ....... G06Q 10/06398 705/7.29 |
| 8,589,198 | B2 | | 11/2013 | McMullin |
| 2003/0004656 | A1 | * | 1/2003 | Bjornson ........... G05B 23/0278 702/34 |
| 2003/0004765 | A1 | * | 1/2003 | Wiegand ............... G06Q 10/06 702/184 |
| 2003/0050824 | A1 | * | 3/2003 | Suermondt ............ G06Q 10/06 705/7.29 |
| 2003/0195794 | A1 | * | 10/2003 | Yasuda .................. G06Q 10/06 705/37 |
| 2004/0158338 | A1 | * | 8/2004 | Mammoser ........... G06Q 10/04 700/96 |
| 2005/0050824 | A1 | * | 3/2005 | Warner .................... B44C 5/04 52/309.8 |
| 2007/0043464 | A1 | * | 2/2007 | Zeif .................. G05B 23/0267 700/108 |
| 2008/0059340 | A1 | * | 3/2008 | McCaherty .......... G06Q 10/087 705/28 |
| 2010/0010654 | A1 | * | 1/2010 | de Kleer ............ G05B 23/0243 700/97 |
| 2012/0130767 | A1 | * | 5/2012 | McMullin ........ G06Q 10/06312 705/7.22 |
| 2015/0142788 | A1 | * | 5/2015 | Toyama ................ G06Q 10/20 707/723 |
| 2018/0089637 | A1 | * | 3/2018 | Subramaniyan ....... G06Q 10/20 |

OTHER PUBLICATIONS

Koumoto, S, et al., "Electricity Fingerprint Analysis Technology for Monitoring Power Consumption and Usage Situations of Multiple Devices by Using One Sensor", vol. 68, No. 2, 2016, pp. 92-94 (4 pages).

International Search Report, dated Jan. 30, 2018 from the International Bureau in counterpart International application No. PCT/JP2017/039147.

* cited by examiner

FIG. 2

| FACILITY | MODEL NUMBER | FAILURE | FAILURE LOCATION | FAILURE DATE/TIME | PRO-DUCT | REPAIR METHOD (IN-HOUSE/ MANUFACTURER) | COST | REPAIR TIME |
|---|---|---|---|---|---|---|---|---|
| MOUNTER | CF02A | MOUNTING FAILURE DROPPED CHIP | NOZZLE | 2016/06/00 10:10 | X | CLEAN NOZZLE (IN-HOUSE) | 0.2 | 0.5 |
| MOUNTER | CF02A | MOUNTING FAILURE DROPPED CHIP | HEAD | 2016/03/01 08:15 | Y | REPLACE HEAD (IN-HOUSE) | 10 | 0.5 |
| MOUNTER | CS33 | MOUNTING FAILURE POSITIONAL DEVIATION | XY AXIS DRIVE MOTOR | 2016/02/21 13:45 | W | REPLACE BOARD (MANUFACTURER) | 30 | 4 |
| MOUNTER | CS33 | MOUNTING FAILURE POSITIONAL DEVIATION | RECOGNITION CAMERA | 2016/01/05 18:00 | Z | REPLACE CAMERA (IN-HOUSE) | 10 | 0.5 |
| SOLDER PRINTER | FX.A01 | SOLDER MISALIGN-MENT | ALIGNMENT STAGE | 2016/04/20 12:15 | Y | REPLACE STAGE, ADJUST ALIGNMENT (MANUFACTURER) | 25 | 3 |

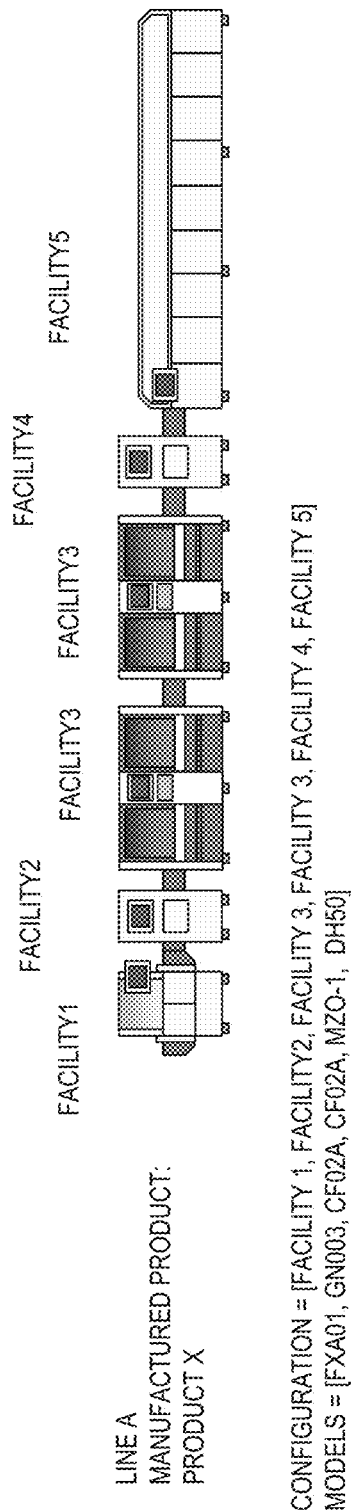

LINE B
MANUFACTURED PRODUCT:
PRODUCT X

CONFIGURATION = [FACILITY 1, FACILITY2, FACILITY 3, FACILITY 3, FACILITY 4, FACILITY 5]
MODELS = [FXA01, GN003, CF02A, CF02A, MZO-1, DH40]

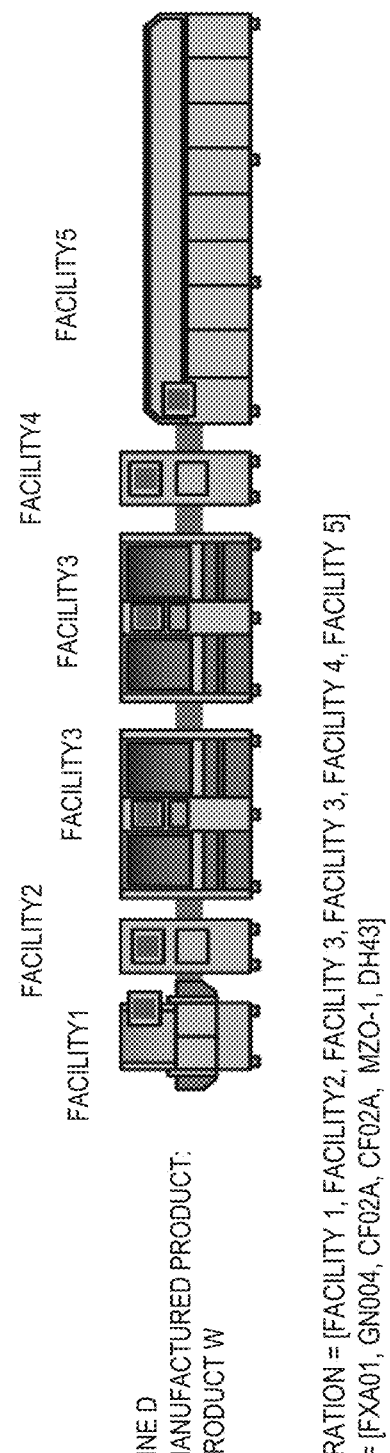

FIG. 4

| LINE | PRODUCT | PRODUCTION TIME | SCHEDULED PRODUCTION COMPLETION DATE /TIME (DELIVERY TIME) | PRODUCTION RESULT (REMAINING) | SET-UP CHANGE TIME | PERIODIC MAINTENANCE |
|---|---|---|---|---|---|---|
| A | X | 180 SECONDS | 2016/07/14 17:00 | 200 (100) | | 2016/07/20 12:00 |
| B | X | 215 SECONDS | 2016/07/14 12:00 | 300 (100) | | 2016/07/20 12:00 |
| C | Y | 240 SECONDS | 2016/07/15 8:00 | 200 (300) | Y->X: 2h<br>X->Y: 2h | 2016/07/16 12:00 |
| D | W | 270 SECONDS | 2016/07/14 20:00 | 200 (100) | W->X: 2h<br>X->W: 2h | 2016/07/17 12:00 |

FIG. 14

PROPOSAL EXAMPLES

```
PROPOSAL A:

IMMEDIATELY REQUEST REPAIR OF FACILITY
  WAIT FOR LINE A TO BE RESTORED AND RESTART PRODUCTION IN LINE A

PROPOSAL B:
  IMMEDIATELY REQUEST REPAIR OF FACILITY
  AS FOR PRODUCTION, DO BOTH (1) AND (2) BELOW
    (1) WAIT FOR LINE A TO BE RESTORED AND RESTART PRODUCTION IN LINE A
    (2) FOUR DAYS LATER, PERFORM ALTERNATE PRODUCTION OF 10% OF WHAT
        WAS PLANNED IN LINE B

PROPOSAL C:
  REQUEST REPAIR OF FACILITY AT REGULAR MAINTENANCE
  START ALTERNATE PRODUCTION IN LINE C AS ALTERNATIVE LINE TWO DAYS LATER

PROPOSAL D:
  REQUEST REPAIR OF FACILITY WHEN PRODUCTION IS OVER(AT LINE RECONFIGURATION)
  AS FOR PRODUCTION, DO BOTH (1) AND (2) BELOW
    (1) REPLACE FAILED FACILITY OF LINE A WITH OPERATIONAL FACILITY IN WAREHOUSE
        AND RESTART PRODUCTION WITHIN TWO DAYS
    (2) PERFROM ALTERNATE PRODUCTION OF 30% OF WHAT WAS PLANNED IN LINE D
        THREE DAYS LATER

PROPOSAL E:
  ...
```

PRODUCTION MANAGEMENT APPARATUS, METHOD, AND NON-TRANSITORY MEDIUM

REFERENCE TO RELATED APPLICATION

This application is a National Stage Entry of PCT/JP2017/039147 filed on Oct. 30, 2017, which claims priority from Japanese Patent Application 2016-213628 filed on Oct. 31, 2016, the contents of all of which are incorporated herein by reference, in their entirety.

FIELD

The present invention relates to a production management apparatus, method, and non-transitory medium.

BACKGROUND

There are various precautionary measures adopted to prevent deterioration of a production facility (abbreviated as "facility") and maintain performance. Preventive maintenance (PM), in which systematical inspection, repair and replacement of a facility are performed, includes time-based maintenance (TBM) or periodic maintenance, in which maintenance is performed at a regular time interval to increase reliability, and condition-based maintenance (CBM), in which condition of a facility is monitored to detect a sign of anomaly and to systematically perform planned measures. Even if a periodic maintenance is performed regularly, there may occur a problem such as sudden (accidental) failure of a facility with production in progress. In this case, one or more parts are replaced or repaired. Recovery activity that takes place after a failure (breakdown) is called "Breakdown Maintenance (BM)." Depending on location of a failure, downtime of a machine will become long, resulting in a loss caused by reduced productivity. For this reason, breakdown maintenance is performed, for instance, on such a part that can be replaced in a short period of time.

Work to identify a specific malfunction (failure) location in a sudden failure or malfunctioning facility and investigate a cause of the failure largely depends on, for instance, an empirical judgment of maintenance personnel. Further, when failure causes are complexly combined, it may take time to identify and solve the failure causes and it may be difficult to immediately determine a repair method suitable for the causes of the failure. Moreover, there may be cases where repair and maintenance cannot be handled in-house and maintenance services are provided by a facility manufacturer, etc. A longer recovery time will result in a longer down time of a facility and a production line, an idle time of which will increase production loss. For this reason, in some cases, re-planning is carried out such as reviewing and changing a production plan in progress according to scheduled delivery time based on progress of production and production capacity of an alternative facility and production line.

A production condition may change when a facility failure occurs during product manufacturing. When production of a product produced by a production line with the facility in failure, is to be changed to another production line, a production condition is reconfigured for that line, based on production plan simulation, etc., so as to increase production capacity and availability in order to avoid late delivery of the products. Further, as an example of changing a production condition, depending on a situation of failure, the number of delivered product lots (the number of production lots) and scheduled delivery time are changed in some cases. When a production plan is readjusted to address a sudden breakdown of a facility with production in progress, there is no time or tool for considering overall optimization in many cases, as a result of which usually only ad hoc measures are taken.

Further, when drafting a recovery plan for addressing a failure, unless a schedule of repairing a failed facility or a time required for repair is known, one may miss a better recovery plan that foresees change in a production condition and the like, after completion of repair of the facility.

In a method for managing a production line disclosed in Patent Literature 1, when a production facility stops working due to failure in a process of production, a stoppage time of the facility is estimated by referring to a failure log file that records contents of failure and stoppage time until restoration of the production facility is completed. When the stoppage time exceeds a predetermined time, a production volume in a temporary production state is simulated based on a record in a facility operation data file (that records production capacity during normal operation and temporary production operation of each production facilities), and depending on a derived production volume, a fault handling process is carried out, selecting whether to start recovery work on the production facility immediately or adopt a temporary production state. If a temporary production state is to be adopted, this will be done after determining whether or not any temporary production means is available. When it is more advantageous to adopt a temporary production state than to start recovery work immediately, adopting a temporary production state is selected, and then failure recovery work is performed thereafter.

[Patent Literature 1] Japanese Patent Kokai Publication No. JP-H02-284853A

[Non-Patent Literature 1] Yoshio Tabata, "Reliability and Economy of the System," Manufacturing and Technology, Vol. 33, No. 2 (Spring, 1981)

[Non-Patent Literature 2] Shigeru Koumoto, Takahiro Toizumi, and Eisuke Saneyoshi, "Electricity Fingerprint Analysis Technology for Monitoring Power Consumption and Usage Situations of Multiple Devices by Using One Sensor," NEC Technical Journal/Vol. 68, No. 2/Special Issue on NEC's Smart Energy Solutions Led by ICT

SUMMARY

When a facility in a production line for manufacturing products fails, it is difficult to create an appropriate recovery plan by considering which is better: repairing the facility or assigning another production line to manufacture products.

Therefore, the present invention was invented in consideration of the problem above, and it is an object thereof to provide an apparatus, method, and non-transitory medium storing a program, each enabling to present a better recovery plan for a facility failure from a point of view of, for instance, production management.

According to an aspect of the present invention, there is provided a production management apparatus comprising: a processor; and a memory that stores program instructions executable by the processor, wherein the processor is configured to determine, based on failure information on a facility for manufacturing a product, a repair time required to repair the facility; and create a recovery plan in accordance with a predetermined production evaluation indicator, based on the repair time and production information on a line with the failed facility, one or more other relevant facilities, and on one or more other relevant lines.

According to an aspect of the present invention, there is provided a computer-based production management method, the method comprising:

determining, based on failure information on a facility for manufacturing a product, a repair time required to repair the facility; and creating a recovery plan in accordance with a predetermined production evaluation indicator, based on the repair time and production information on a line with the failed facility, one or more other relevant facilities, and on one or more other relevant lines.

According to an aspect of the present invention, there is provided a program causing a computer to execute processing comprising:

determining, based on failure information on a facility for manufacturing a product, a repair time required to repair the facility; and creating a recovery plan in accordance with a predetermined production evaluation indicator, based on the repair time and production information on a line with the failed facility, one or more other relevant facilities, and on one or more other relevant lines.

According to the present invention, there is provided a non-transitory computer readable recording medium that stores the program above.

According to the present invention, a better recovery plan can be presented for a facility failure from a point of view of, for instance, production management. Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 2 is a diagram illustrating an example of a history of failure and handling information in one embodiment of the present invention.

FIG. 3A is a diagram illustrating a production line and facilities arranged in a factory.

FIG. 3D is a diagram illustrating a production line and facilities arranged in a factory.

FIG. 4 is a diagram illustrating an example of production information in one embodiment of the present invention.

FIG. 14 is a diagram illustrating replanning proposal options of an example embodiment of the present invention.

DETAILED DESCRIPTION

Figure 23:
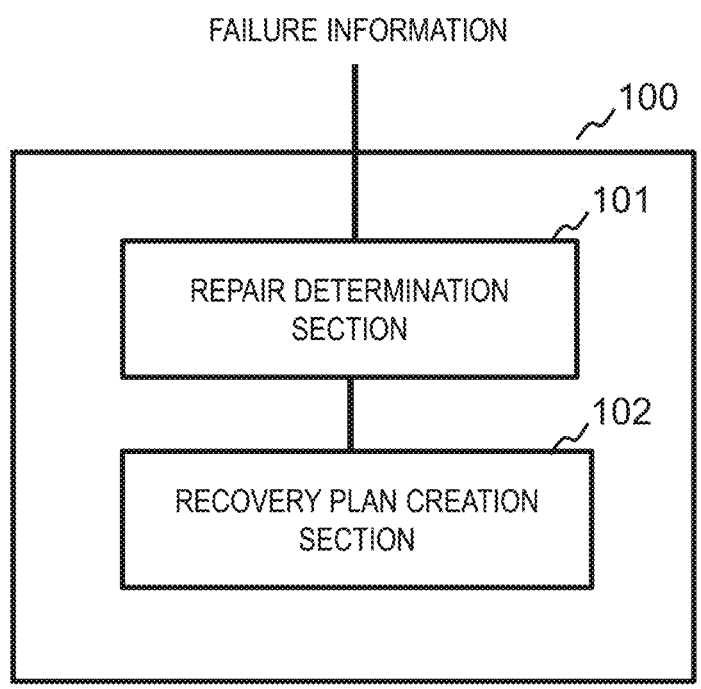
FIG. 23 is a diagram illustrating a basic embodiment of the present invention.

Several example embodiments of the present invention will be described below. First, a basic embodiment of the present invention will be described. With reference to FIG. 23, a production management apparatus 100 in a basic embodiment of the present invention includes a repair determination section 101 that determines, based on failure information on the facility for manufacturing a product, a repair time required to repair the facility, and a recovery plan creation section 102 that creates a recovery plan in accordance with a predetermined production evaluation indicator, based on the repair time and production information on a line with the failed facility, one or more other relevant facilities, and one or more other relevant production lines.

In a basic embodiment of the present invention, the recovery plan creation section 102 may be configured to present a created recovery plan and recreate a recovery plan adapted to at least one of the production evaluation indicators selected by a user to present the recreated recovery plan to the user. The failure may be one that occurs during manufacturing of the product by a production line of the facility.

The production management apparatus 100 in a basic embodiment of the present invention may be configured to further comprise a storage apparatus (105 in FIG. 1) that stores a failure history of the facility and a repair history including details of repair done for the failure and time required therefor. The repair determination section 101 may be configured to determine a repair method and a repair time for the facility, based on the failure and repair histories of the facility, the failure and repair histories of facilities of a type identical to or similar to the facility, the results of online diagnosis by the facility manufacturer, or a combination of at least two of the above.

In a basic embodiment of the present invention, the repair method may include any of the following: replacing or adjusting one or more parts constituting the facility, replacing or adjusting a unit including the part(s), and replacing the facility.

In a basic embodiment of the present invention, the repair determination section 101 may determine a repair method for the facility based on availability of the facility.

The production management apparatus 100 in a basic embodiment of the present invention may be configured to further comprise a storage apparatus (106 in FIG. 1) that stores information such as a product manufactured in each of production lines, production capacity of each of the production lines, and a production plan and a maintenance plan as the production information.

The recovery plan creation section 102 may be configured to create a production plan change proposal that changes the production plan for the production line including the failed facility or production plans for the production line including the failed facility and at least another production line based on at least one of the repair method and the repair time, at least any one of the production capacity of the line, progress of the production plan, delivery information, and the maintenance plan, and the production evaluation indicator, to present the production plan change proposal as the recovery plan with a repair timing.

In a basic embodiment of the present invention, the recovery plan creation section 102 may present, for instance, any one of the following production plan change proposals as the recovery plan:

not immediately repairing the failed facility, but postponing repairing of the failed facility until a predetermined time;

stopping the production line including the failed facility and restarting the production in the line after the failed facility has been repaired;

replacing the facility with a facility of an identical type or similar one in a line equipped with the facility in failure and restarting production in the line;

stopping the line including the failed facility, repairing the facility, and allocating production of products manufactured in a line to another line; and configuring a new line, and manufacturing the products manufactured in the line including the failed facility in the new line.

The production management apparatus 100 of another mode of the present invention may be configured to further comprise a failure diagnosis section (107 in FIG. 7) that obtains the state of the facility and diagnoses a failure of the facility from the state of the facility. The failure diagnosis section (107 in FIG. 7) may predict when the facility may fail based on how much the facility is deteriorated, and the recovery plan creation section 102 may create the recovery plan based on a prediction as to when the facility may fail.

In a basic embodiment of the present invention, the repair determination section 101 may set a repair timing for the facility when the window of time until the maintenance limit time of the facility derived by the failure diagnosis section (107 in FIG. 7) and periodic maintenance at least partly overlap (in terms of date and time, etc.) or are temporally close.

Figure 1:
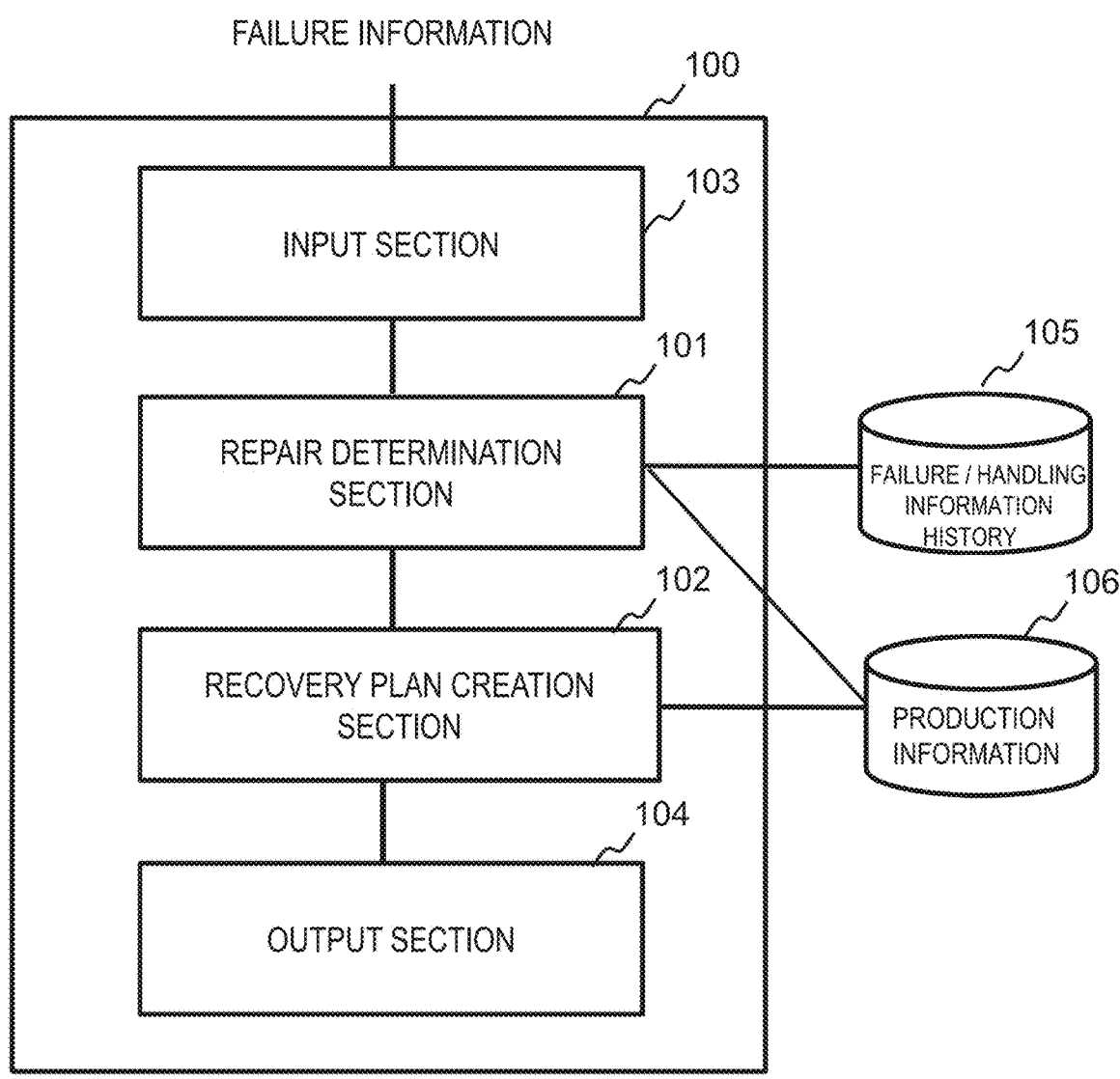
FIG. 1 is a diagram illustrating a configuration of an embodiment of the present invention.

FIG. 1 is a diagram for explaining a configuration example of one embodiment mode of the present invention. Referring to FIG. 1, the production management apparatus 100 includes an input section 103, a repair determination section 101, a recovery plan creation section 102, an output section 104, and storage apparatuses 105 and 106. The input section 103 receives failure information.

In FIG. 1, the input section 103 may be configured to receive from a sensor and/or inspection apparatus of a facility, both not shown in the drawing, failure information regarding the facility (failure status, and failure location, etc., however, it may be conditions such as a sign of failure, defect, anomaly, etc.) and provide the failure information to the repair determination section 101. Alternatively, the input section 103 may obtain diagnostic results from a self-diagnosis program of a facility or online diagnosis results from remote diagnosis of the facility via, for instance, communication means or a storage medium, extract failure information (failure status, failure location, etc.) included in the diagnostic results to provide the information to the repair determination section 101. Alternatively, the input section 103 may be configured to receive failure information entered by an operator or a maintenance personnel via a terminal (maintenance terminal) to provide the failure information to the repair determination section 101. Alternatively, the input section 103 may be configured to comprise an input device and a display apparatus for a user to directly enter failure information.

The storage apparatus 105 stores a failure history of a facility and a history of handling information in the past. The handling information stored in the storage apparatus 105 may include information such as, for instance, repair method (failure repair, adjustment, replacement (each part, board, unit (module)), repaired in-house, repair requested/ordered to a facility manufacturer, etc.), repair timing (repair will be performed how many hours or days later from now), and the time required for repair.

The storage apparatus 106 stores production information. Though not limited thereto, the production information may include:

production plan (schedule, production capacity plan, inventory plan), production progress information (production results, scheduled production completion date and time, delivery date (time), etc.), customer information, production capacity (production capacity of each production line and facility; production capacity may be, for instance, a time required for manufacturing a product), and production cost (energy consumption, etc.).

Further, the storage apparatus 106 may further include facility maintenance management information (periodic maintenance time for facility(ies) and production line(s), time when a facility part(s) are replaced, etc.) in the production information or separately therefrom.

In one embodiment of the present invention, the repair determination section 101 determines at least a time (repair time) required to repair a failure based on the failure information of the facility provided by the input section 103. When determining a failure repair time, the repair determination section 101 may obtain and present a repair method and repair time corresponding to the facility failure based on the failure history and the action (repair) information history stored in the storage apparatus 105.

In one embodiment of the present invention, based on a repair timing and repair time for the failure and production information (for instance, production information of standby facilities, other available facilities and production lines), the recovery plan creation section 102 presents a recovery plan (repair method, repair timing, etc., and production plan change proposal) in accordance with the production evaluation indicator (for instance, on-time delivery rate, production cost, etc.) that take into account a plurality of production lines such as the line including the failed facility and other facilities and lines overall.

In one embodiment of the present invention, for instance, the recovery plan creation section 102 may calculate the production evaluation indicator by calculating (or predicting/estimating) delivery-time achievement rate and production cost (for instance energy consumption) based on the production information of a plurality of production lines. The recovery plan creation section 102 may present at least one recovery plan in which the calculated production evaluation indicator satisfies parameters or a best recovery plan. Further, the energy consumption may be a power consumption obtained by adding power consumption of the facility(ies) (production line) and power consumption of air-conditioning facility(ies) used for cooling down the facility(ies) (production line).

A system administrator or the like may set a default production evaluation indicator (for instance, on-time delivery is a top priority) in advance. Alternatively, when a recovery plan is created at a time of failure, a user may select one or more production evaluation indicators. The storage apparatus 106 may store the selected production evaluation indicator(s).

The output section 104 converts the created recovery plan into, for instance, a predetermined display format, and presents the result on a display apparatus not shown in the drawing. Further, as a matter of course, the output section 104 may be configured to transmit a recovery plan to a terminal connected via a network not shown in the drawing and have the recovery plan displayed on the terminal.

An example of creating a recovery plan by the recovery plan creation section 102 according to one embodiment of the present invention will be described.

Figure 3B:
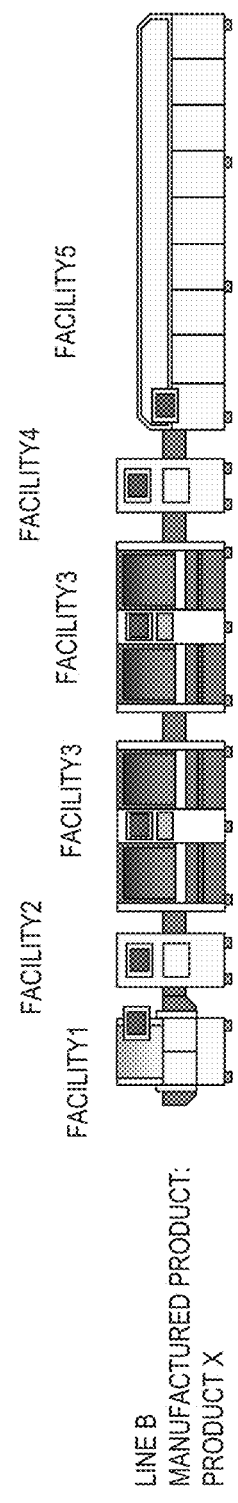
FIG. 3B is a diagram illustrating a production line and facilities arranged in a factory.
Figure 3C:
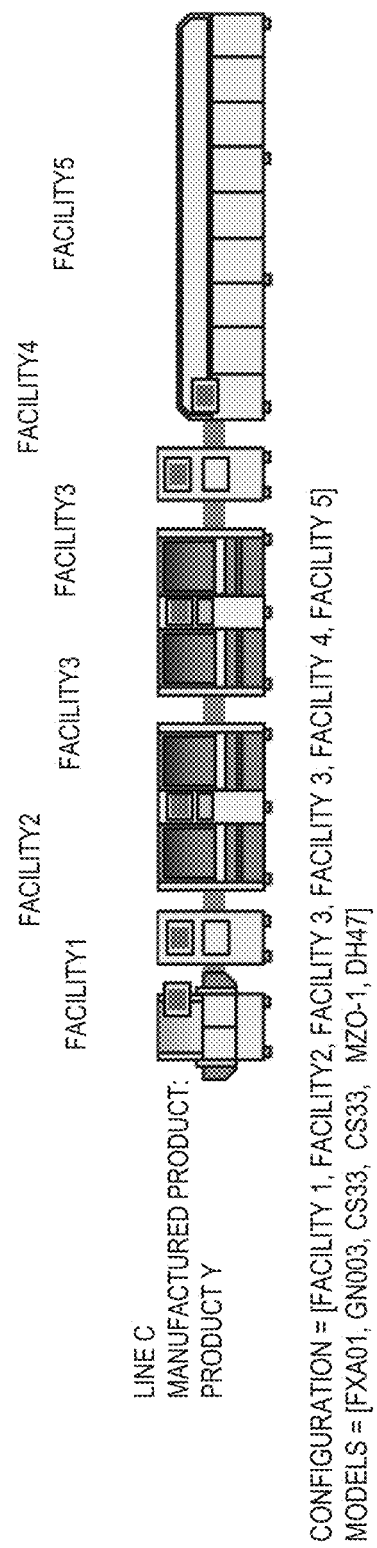
FIG. 3C is a diagram illustrating a production line and facilities arranged in a factory.

In a case where an on-time delivery rate is adopted as the production evaluation indicator, an alternative production line (for instance, a line that does not require facility replacement; for instance, line B in FIG. 3B) is available at a time of facility failure, and the alternative line has enough production capacity to meet a deadline, the alternative line may be used to continue production. In other words, on-time delivery may be achieved by allocating production to the alternative line.

In a case where a customer importance degree is adopted as the production evaluation indicator, an alternative production line (for instance, a line that does not require facility replacement; for instance, the line B in FIG. 3B) is available at a time of facility failure, and the products are more important than those scheduled to be manufactured in this alternative line (for instance, higher profit, difficult to extend a delivery time, etc.), profit or relationship with a customer may be maintained by continuing the production in the alternative line. Products originally manufactured in this alternative line and pushed out from the line due to production of more important products may be manufactured in a production line of less importance. If the products manufactured in the alternative line (for instance, the line B) are more important from a viewpoint of customer importance, the production may be restarted after the original line (for instance, line A in FIG. 3A) is repaired, without carrying out alternative production in the alternative line.

A case where a yield rate (=1−fraction defective) is adopted as the production evaluation indicator, for instance, will be described. When a production line of a failed facility has special facility or facility requiring special setting (configuration), it may be more effective in terms of production quality to restart the production in the original production line after the failed facility is repaired than to substitute (readjust) another production line.

Further, one or more following items may be used as the production evaluation indicator: work man-hour, work time, personnel expenses, energy consumption (production cost), etc.

Alternatively, it may be more effective in terms of the production evaluation indicator (for instance, production cost, work man-hour, work time, personnel expenses, energy consumption, etc.) to postpone the repair than to repair the failed facility and restart the production in the original line in some cases. In this case, for instance, an alternative line with some margin in terms of production planning may be used for the production.

In other words, depending on a nature of the facility failure, in terms of an overall cost, it may be more advantageous to forgo repairing the failure right after the failure has occurred. For instance, together with another line with a facility, a repair of which is performed after the first facility broke down, a plurality of production lines are repaired simultaneously at a timing common to the a plurality of production lines. As a result, compared to a case where the line is stopped to perform repair each time facility failure occurs, an overall availability of a plurality of lines may be improved and a workload may be reduced in some cases.

Alternatively, when a repair time of a failed facility is scheduled close to a timing of a periodic maintenance of the line or a timing of part replacement for the facility (or overlapping temporally), it may be possible to have a replanning proposal (recovery plan) in which the failed facility is left unrepaired immediately following an occurrence of the failure and products are manufactured in the original production line of the restored facility after the failure is restored at a periodic maintenance (part replacement). As described, according to one embodiment of the present invention, a better recovery plan for facility failure can be presented from a standpoint of, for instance, production management.

Further, in one embodiment of the present invention, in addition to a failure where a facility stops operation, a failure of a facility may include a so-called "sign" of a failure in which the facility operates normally, but there is one or more parts which had better to be replaced, or where a yield rate of products is on a decline. For instance, detection of a failure may be assumed in a case where a degree of facility degradation is detected to exceed a threshold value indicating a sign of failure due to change over time, change over years and so on. When a small anomaly is detected early due to a sign of failure, this can be addressed, for instance, by performing as-needed maintenance (maintenance performed as necessary).

The failure information may be entered directly by a maintenance personnel of a manufacturer of the failed facility via the input section 103. In particular, there may be such a case in which it is difficult for factory personnel on their own to analyze a failure caused by a plurality of failure causes. If the failure information determined by the maintenance personnel of a facility manufacturer is entered from the input section 103, the failure information stored in the storage apparatus 102 will be more accurate. As a result, a more appropriate recovery plan can be presented for the overall operation of the factory.

In addition to the repair time, it takes time to identify a failure in a facility, obtain and replace one or more parts, adjust a parameter(s) of a facility restored, perform a test operation, and then restart (restore) production in the production line. Similarly, when products, which are scheduled to be manufactured in the production line which gets suspended, are allocated to another production line for manufacturing, a setup change and adjustment of a parameter(s) of the facility are carried out in a new production line, and a configuration change of a production plan is performed. As a result, in some cases, it may be more effective to continue the production in the original production line after the failed facility of the line gets repaired, than to allocate the production to another production line, in terms of work man-hour and a yield rate of the manufactured products.

Therefore, the recovery plan creation section 102 creates a recovery plan which takes into account a repair time for the failure of the facility and information such as a production plan, progress, and production results and conditions of another production line.

The present invention can be applied to production lines of various products, however, in order to facilitate understanding of a concept of the invention, the description below uses an example of an SMT (Surface Mount Technology) production line. The present invention, as a matter of course, is not limited to application to an SMT production line.

FIG. 2 is a diagram for explaining failure/handling information history stored in the storage apparatus 105 in FIG. 1. FIG. 2 illustrates an example of a failure history of an SMT production line. The drawing shows an example of the failure/handling information history indicating a history of facility failures in the past and how each failure was addressed (recovery method: part replacement, board replacement, entire unit replacement, whether the repair was done in-house or outsourced to a manufacturer). Further, a repair location and a repair method may be entered via a maintenance terminal by maintenance personnel who actually is involved in repairing the failure. The repair location and a repair method may and may be stored in the storage apparatus 105.

A mounter is an apparatus for mounting electronic components on a printed circuit board; it takes images of parts (chips) and a board surface using an image recognition technology, determines and checks a center and a dimension of each part, and places each part on a predetermined position on the board. At this time, the nozzle of the head picks up an electronic component (chip) from the feeder (tape, tray). When a proper nozzle is not used for a given part, the part may get shifted or dropped from the nozzle due to the acceleration of axis movement. If any part (chip) is misaligned by the mounter, solder joints may be formed with the part mounted in the wrong position with regard to the land pattern of the printed circuit board after a reflow process.

Though not limited thereto, in the example of FIG. 2, information identifying a facility (facility name and model number), failure information (failure (defect) status, failure location, failure date (year, month, and day)), and information such as a product name manufactured by the facility in question, repair method, cost, and repair time (in hours) may be stored. Note that cost is represented only as a reference example.

FIGS. 3A to 3D are illustrative drawings for explaining SMT lines arranged in a factory. In the lines A, B, C, and D in FIGS. 3A to 3D, products X, X, Y, and W are manufactured, respectively. Facility 1 is a solder printer; facility 2 is a visual inspection machine that inspects soldering finishes applied to a board by the printer; facility 3 is a mounter that mounts parts (chips) on the board; facility 4 is a visual inspection machine that inspects the board on which the parts are mounted by the mounter; and facility 5 is a reflow oven that heats and melts solder.

FIG. 4 is a diagram for explaining part of the production information in the storage apparatus 105 in FIG. 1. The example of FIG. 4 shows names of products manufactured in the lines A, B, C, and D in FIGS. 3A to 3D, production time (time required for production of one board), production progress information such as scheduled production completion date/time (delivery date) and production result (remaining), setup change time, and periodic maintenance time of each production line. The production information is as a matter of course not limited to the above. Now let's assume that a failure is detected in a head nozzle of the facility 3 (mounter) of the line A in FIG. 3A at 11:00 on Jul. 14, 2016. In FIG. 4, "production result (remaining)" indicates the number of products already manufactured and the number of products remaining to be manufactured at the point of time (11:00) when the failure was detected in the facility 3 of the line A in FIG. 3A. In the line A of FIG. 3A, 200 of the products X have been manufactured by the time of the failure (11:00) and 100 of the products X remain to be manufactured until originally scheduled production completion date/time (delivery time).

From the failure history information in FIG. 2, the repair determination section 101 estimates a repair time required for repairing (replacing the head nozzle) to be, for instance, one hour. At this time, the product X is not allocated to another line, the line B (FIG. 3B). Although the failure history information of the mounter (CF02A), the facility 3 of the line A in FIG. 3A, does not include a failure history corresponding to a current failure of the mounter, the repair determination section 101 may use a repair method and repair time for the mounter (CS33) which is the facility 3 of the line C in FIG. 3C, if failure/handling history information of a mounter (CS33 which is the facility 3 of the line C in FIG. 3C, corresponds to a current failure of the mounter.

Starting from 11:00, if 100 of the products X are continuously manufactured in the line B in FIG. 3B, since a production time of the product X per one piece is 215 seconds, it will require, 215 seconds x 100/60=358 minutes and 33 seconds=5 hours 58 minutes and 33 seconds, and the production will be complete at 16:58:33. The scheduled production completion date/time of the product X originally planned for the line B is 17:00. This means that the line B does not have room to take on and manufacture several pieces of the remaining products X that were produced in the line A in FIG. 3A. Further, if the line A is suspended and the line C in FIG. 3C starts to manufacture the product X manufactured in the line A, a setup change (2 hours) from the product Y to the product X will be carried out, the facility parameters will be set/adjusted, and the product X will be manufactured after testing the line by running the products. Then, another setup change (2 hours) from the product X to the product Y will be necessary. In this case, the production completion date/time of the product Y manufactured in the line C in FIG. 3C will be delayed from the original scheduled production completion date/time, resulting in a late delivery. This is also the case with the line D in FIG. 3D.

On the other hand, in a case where the remaining 100 of the products X are continuously manufactured starting from, for instance, 12:00 after the head of the mounter (the second facility 3) in the line A of FIG. 3A has been replaced and the line is tested by running some products, with no problem, the line A is able to finish manufacturing the products X in 180 seconds×100=300 minutes=5 hours, i.e., at 17:00, meeting the scheduled production completion data/time of the product X originally planned for the line A.

Further, when a plurality of actions (repairs) are recorded for a detected facility failure, a plurality of corresponding repair times may be calculated.

Figure 5:
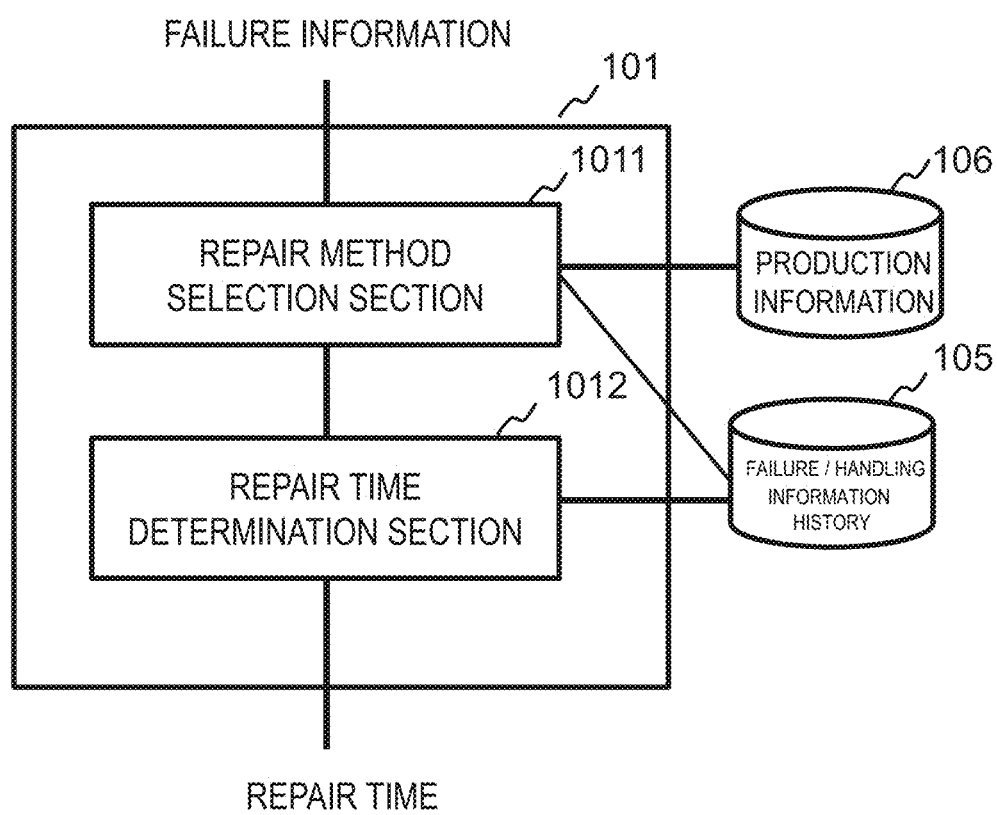
FIG. 5 is a diagram illustrating a configuration of a repair determination section of an example embodiment of the present invention.

FIG. 5 is a diagram illustrating a configuration of the repair determination section 101 in FIG. 1. Referring to FIG. 5, the repair determination section 101 includes a repair method selection section 1011 that selects a repair method by referring to the production information stored in the storage apparatus 106 and the failure/handling information history stored in the storage apparatus 105, and a repair time determination section 1012 that derives how long the repair time will be when a failure is repaired according to a repair method selected by the repair method selection section 1011.

The repair method selection section 1011 may sometimes decide not to repair a given facility failure. In this case, the repair time determination section 1012 set the repair time to 0. The present invention is as a matter of course not limited to an embodiment in which the repair method selection section 1011 selects a repair method and the repair time determination section 1012 determines (estimates/calculates) the repair time according to the repair method selected by the repair method selection section 1011. For instance, the repair method selection section 1011 may select an optimum repair method based on repair times determined (estimated/calculated) by the repair time determination section 1012 for several repair method candidates.

The repair time determination section 1012 may receive via the input section 103 in FIG. 1 information from a facility (for instance, the facility 3 (mounter) in FIGS. 3A to 3D) or from an inspection apparatus (for instance, the facility 4 (visual inspection machine) in FIGS. 3A to 3D) provided after the facility, and calculate a time (repair time) required for repairing a failure based on the history of the failure and the handling information.

For instance, when a component falling from a head of the mounter is detected (dropped chip) while being moved to a position on the board during component mounting (for instance, one-head configuration) by a facility (for instance, the facility 3 (mounter) in any of FIGS. 3A to 3D), a nozzle may be cleaned, or the head may be replaced, depending on a degree of deterioration. The time required for each repair is stored in the storage apparatus 105 as the history information. It should be noted that FIG. 2 is a simplified only for the sake of explanation. The storage apparatus 105 may as a matter of course store a history and action (repair method, etc.) according to a type of failure for each facility. Further, the storage apparatus 105 may store a usage record for each facility and how long the facility has been used. Moreover, if one or more parts of the facility are replaced on a regular basis, the storage apparatus may be configured to record information such as the last replacement date and a next replacement date.

Handling for a failure includes the following:
performing repair in-house;
requesting maintenance personnel of a facility manufacturer to repair and handing over one or more parts; and
not repairing it this time.
Repair methods includes the following:
repairing of a failed part(s) of the facility;
replacing a failed part(s);
replacing a module/unit including a failed part(s);
replacing the facility in its entirety, and so forth.

The repair method selection section 1011 may make its selection based on the failure/handling information history of the past that has been accumulated in the storage apparatus 105 and the production information that has been stored in the storage apparatus 106. If the storage apparatus 105 does not have history information of the same type of failure as the current one stored, the repair method selection section 1011 may derive a repair method, based on the history information of a failure similar to or including the current one.

When selecting a repair method, the repair method selection section 1011 may determine whether the production should be continued without repairing the facility failure (postponing the repair) or the repair should be carried out with the line that is being suspended, based on information such as a production plan (production volume) for a time left until a scheduled delivery time or a periodic maintenance from an occurrence time of the failure, yield (fraction defective), and so forth. Production in the line with the facility in failure is suspended during when the failed facility is repaired. A handling with a lower cost may be selected by taking into account an idle loss per unit time regarding the suspended line during the repair and an yield in a case wherein a repair of the failed facility is postponed and the production is kept going (if the yield decreases (or fraction defective increases), more products will need to be manufactured, thus increasing a production cost).

When an alternative facility replaces the failed facility during a repair and the production is restarted in the original line, the work man-hour increases due to configuration/adjustment of a parameter(s) of the alternative facility and a setup change in a case where products to be manufactured are reallocated to an alternative line. When a failure occurs immediately before a periodic maintenance for the line or immediately before replacement of one or more parts when such replacement is performed for the facility on a regular basis, it may be more advantageous in terms of cost not to repair the facility immediately (postpone the repair). The repair method selection section 1011 may determine a repair method with reference to production information (production plan, maintenance plan information) stored in the storage apparatus 105.

The repair method selection section 1011 may select a repair method by taking into account an availability of a facility/line. This case will be described using a simple model. For instance, a failure time distribution F(t) (a probability of a facility failing until time t) and a repair time distribution R(t) are approximated using an exponential distribution as follows.

$$F(t)=1-\exp(-\lambda t) \quad (1)$$

$$R(t)=1-\exp(\mu t) \quad (2)$$

Here, $\lambda$ is a failure rate, and $\mu$ is a repair rate. Note that $\lambda$ and $\mu$ are assumed to be time-independent constants only for the sake of simplicity. For instance, a meantime to a failure of a facility and an mean time of a time actually required for repairing a failure (a time period from failure detection to completion of repair) may be used.

Figure 6:
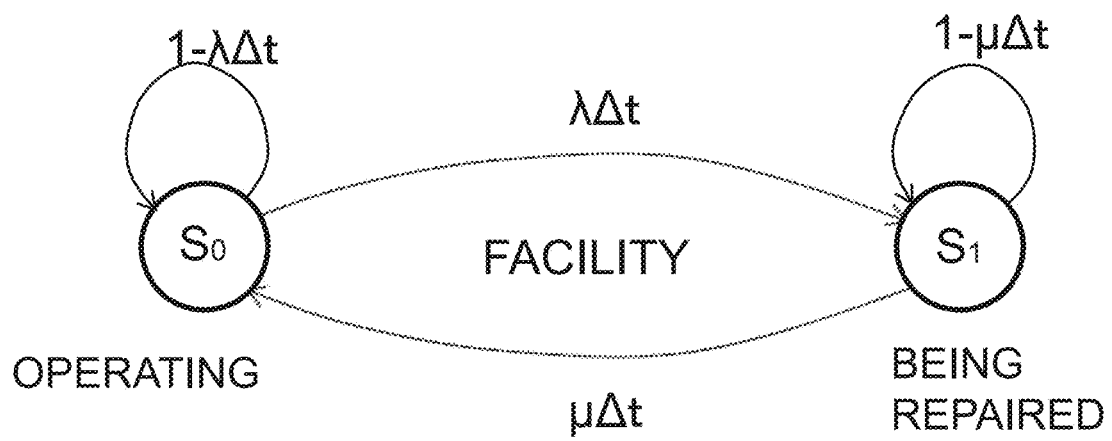
FIG. 6 is a diagram for explaining an example of state transition of facilities.

It is assumed that $P_{ij}(t)$ is a probability of a facility being in a state $S_i$ at time t=0 and being in a state $S_j$ at time t. As shown in FIG. 6, $S_0$ is an operating state (normal state), and $S_1$ is a repair state (failure state). $S_0$ transitions to $S_1$ with a probability $\lambda$, and $S_1$ transitions to $S_0$ with a probability $\mu$.

It is assumed that a facility starts in an operating state at time t=0. A probability of the facility operating at time t and not failing during time Δt is approximated as follows.

$$1-F(t)=\exp(-\lambda \Delta t) \cong 1-\lambda \Delta t \quad (3)$$

A probability of the facility being repaired at time t and the repair being completed during time Δt is approximated as follows.

$$M(t)=1-\exp(\mu \Delta t) \cong \mu \Delta t \quad (4)$$

A probability of the facility being in the operating state $S_0$ at time t and being in the operating state $S_0$ during time t+Δt is approximated as follows.

$$P_{00}(t) \times (1-\lambda \Delta t) \quad (5)$$

A probability of the facility being in the repair state $S_1$ at time t and transitioning to the operating state $S_0$ during time t+Δt is approximated as follows.

$$P_{01}(t) \times \mu \Delta t \quad (6)$$

Therefore, the probability of the facility being in the operating state at the time t+Δt is given (approximated) as follows.

$$P_{00}(t+\Delta t)=P_{00}(t) \times (1-\lambda \Delta t) + P_{01}(t) \times \mu \Delta t \quad (7)$$

A probability of the facility being in the operating state $S_0$ at time t and being in the repair state $S_1$ also at time t+Δt is given (approximated) as follows.

$$P_{01}(t+\Delta t)=P_{00}(t) \times \lambda \Delta t + P_{01}(t) \times (1-\mu \Delta t) \quad (8)$$

By applying time-differentiating (Δt→0) to the expressions (7) and (8), we have expressions (9) and (10).

$$\frac{d}{dt}P_{00}(t) = -\lambda P_{00}(t) + \mu P_{01}(t) \quad (9)$$

$$\frac{d}{dt}P_{01}(t) = \lambda P_{00}(t) - \mu P_{01}(t) \quad (10)$$

By applying Laplace-transformation to the above expressions (9) and (10) with initial conditions $P_{00}(0)=1$, and $P_{01}(0)=0$, we solve $P_0{'}(s)$ and by applying an inverse Laplace-transformation to $P_{00}{'}(s)$, we have the following expression.

$$P_{00}(t) = \left(\frac{\mu}{\lambda+\mu}\right) \times \{1 + \exp(-(\lambda+\mu)t)\} \quad (11)$$

With t→∞, a steady availability ρ of the facility is given by the following expression.

$$\rho = \frac{\mu}{\lambda+\mu} = \frac{(\mu+\lambda)}{1+(\mu+\lambda)} \quad (12)$$

The repair determination section 101 may select a repair method in consideration of the availability ρ or μ/λ.

The repair method selection section 1011 may calculate the repair rate μ using a reciprocal of Mean Time To Recovery (MTTR) based on the failure/handling information history (history information on failure repair time) stored in the storage apparatus 105 in FIG. 1. In a case where the failure/handling information history stored in the storage apparatus 105 has several corresponding failure repair methods, the repair method selection section 1011 may select a repair method in which, for instance, the facility availability p is a most preferable. At this time, a repair method having a best availability of a line including a plurality of facilities arranged in series may be selected. Alternatively, a repair method providing a high probability of a facility being in the repair state $S_1$ at time t and transitioning to the operating state $S_0$ during time t+Δt (refer to expressions (6) and (7)), i.e., a high repair rate μ, may be selected. Further, the repair method selection section 1011 may calculate the availability of a line in which a plurality of facilities are connected in series and select a repair method for the failed facility that will give a best availability of the line.

Alternatively, in a case where a part replacement is replaced periodically (time T), and x is a time left as a planned period, u(x, y) is a total expected cost of taking an optimal action immediately after a part (facility) of age y fails, F(t) is a failure time distribution (a probability of a facility failing until time t), R(t) is a repair time distribution, C is an idle loss amount per unit time, K is a fixed cost per repair, and m is an average of F(t) (repair time is 0), u(x, y) is given by the expression (13) below using a principle of optimality of dynamic programming (Non-Patent Literature 1). Further, Non-Patent Literature 1 gives analysis of periodic replacement in which one or more parts is replaced all at once at regular time intervals, however, it can be similarly applied to periodic maintenance and common maintenance in which a maintenance of a line is performed in common with one or more of other lines.

$$u(x,y)=Cx+C \min[0; K/C-m+T_F(x)] \quad (13)$$

$$T_F(x)=\int_x^\infty (t-x)dF(x) \quad (14)$$

Note that min (A, B) denotes a smaller value of A and B. $T_F(x)$ is a non-negative, monotonically increasing convex function with respect to x. When m>K/C, it is optimal to: suspend and repair a line if $x^* \geq T_F^{-1}(m-K/C)$, and not repair (leave it) if $x^* < T_F^{-1}(m-K/C)$.
$T_F^{-1}$ is an inverse function of $T_F$.
When a failure occurs at a time $x^* \geq T_F^{-1}(m-K/C)$ which is a remaining time until a next part replacement, it is optimal in terms of a total expected cost to repair the failure immediately after an occurrence of the failure.

u(x, y) derived by approximating the failure time distribution F(t) and the repair time distribution R(t) using the exponential distribution of the above expressions (1) and (2) is given by an expression (15) (Non-Patent Literature 1).

$$u(x, y) = Cx + \quad (15)$$
$$C\min\left[0; K + \frac{C\mu}{\lambda(\lambda-\mu)}(\exp(-\lambda x) - \exp(\mu x)) - \frac{C}{\lambda}(1-\exp(-\mu x))\right]$$

Thus, by solving the equation (16) numerically for values of μ/λ, K/C, a time boundary value x* which is used to determine whether a failure should be repaired or left unattended may be derived.

$$K + \frac{C\mu}{\lambda(\lambda-\mu)}(\exp(-\lambda x) - \exp(-\mu x)) - \frac{C}{\lambda}(1-\exp(-\mu x)) = 0 \quad (16)$$

In one embodiment of the present invention, once deciding that a failed facility should be repaired, the repair determination section 101 may estimate, calculate or determine a time required for completing the repair based on online diagnosis provided by a facility manufacturer. The repair determination section 101 may be configured to perform machine learning based on, for instance, a repair time for failure information and obtain a repair time corresponding to failure information currently received.

In one embodiment of the present invention, the recovery plan creation section 102 evaluates a production replanning and a repair timing of a failed facility, using in addition to a handling method for handling the failed facility and a time required for repair, production information (available facility, other facility(ies), a production plan for the line), and the production evaluation indicator (for instance, at least one of on-time delivery rate, customer importance degree, and defective product rate), to generate and present a production plan change proposal that changes a production plan. With this arrangement, the recovery plan creation section 102 is able to present a change proposal that can control a period during when the failed facility cannot be used, even if production loss occurs such as repair and adjustment of other facility(ies) caused by facility failure. As a result, the recovery plan creation section 102 cane generate a recovery plan which can anticipate not only production cost but also a change after repair completion, and with which an overall production evaluation indicator will become higher, and that anticipates not only production cost but also changes after repair completion.

With detection or prediction of facility failure, or failure sign detection, a time required for completing repair to a failed facility or a facility of which a failure is predicted may be determined.

The recovery plan creation section 102 may receive a production evaluation indicator such as on-time delivery rate, customer importance degree, and defective product rate, evaluate a production replanning and a repair timing using the received production evaluation indicator, and generate and present a production plan change proposal changing the production plan or an option for selecting the change proposal. Several example embodiments will be described with reference to the drawings below. Note that an SMT line, described as production lines, will be used as examples in the example embodiments below as well, however, it is a matter of course that the example embodiments are not limited to an SMT line Example Embodiment 1

Figure 7:
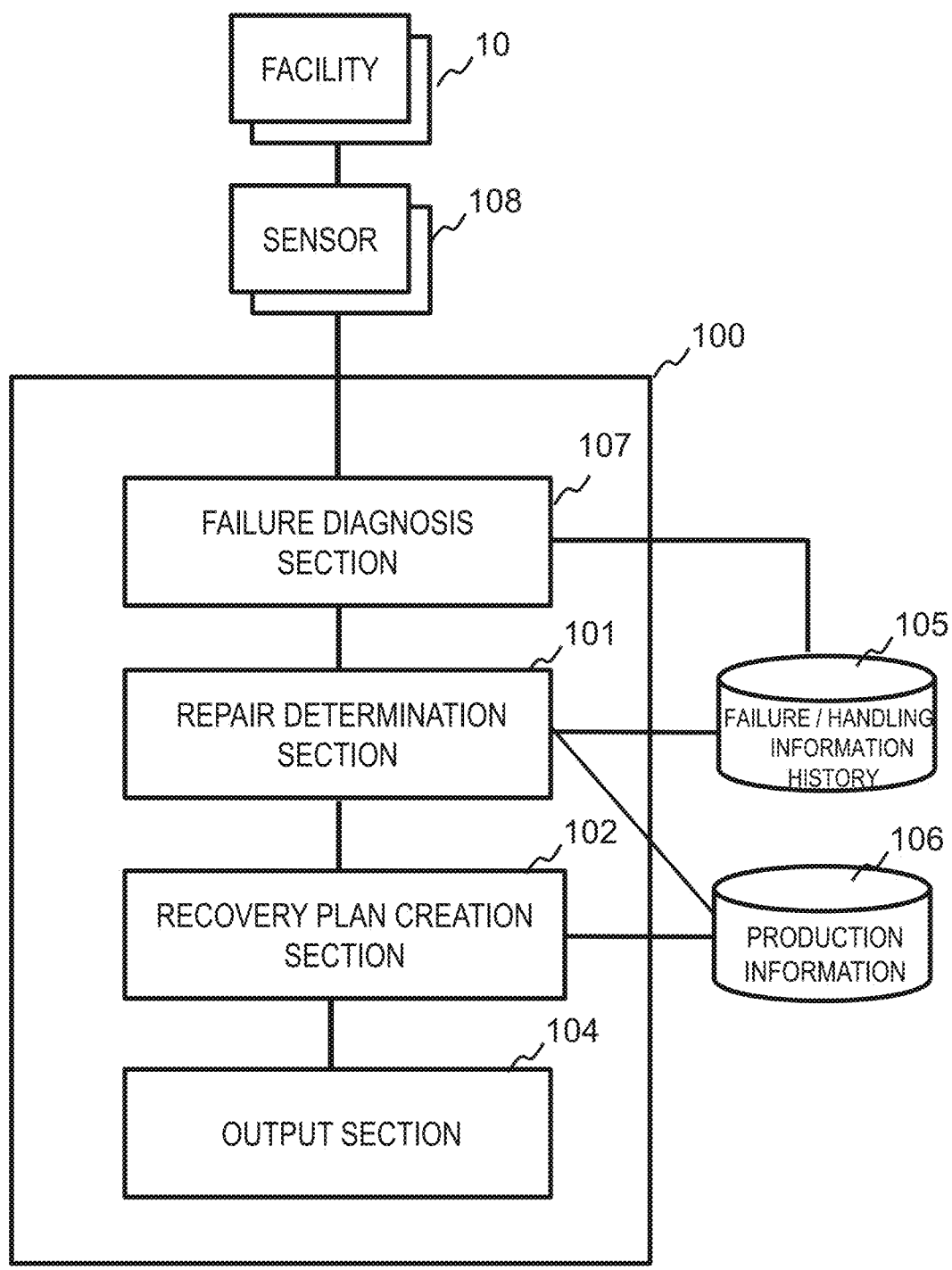
FIG. 7 is a diagram illustrating a configuration of an example embodiment of the present invention.

FIG. 7 is a diagram illustrating a first example embodiment. With reference to FIG. 7, a sensor 108 installed in a facility 10 or attached to the facility 10 externally monitors a state of the facility 10. A failure diagnosis section 107 detects a facility failure based on output information from a sensor 108. The sensor 108 may be a current sensor that measures a power supply current of the facility 10 or a vibration sensor that detects vibration.

The failure diagnosis section 107 may analyze a sensed waveform transmitted from the sensor 108 and identify a failure in the facility 10 based on a feature value(s) of the waveform. Alternatively, the sensor 108 may be a recognition camera of the facility 2 (a visual inspection machine that inspects soldering finishes applied to a board by the facility 1 (a solder printer) and the facility 4 (a visual inspection machine that inspects how the part are mounted on the board by the mounter of the facility 3) in FIGS. 3A to 3D. In a case where error information is outputted by the visual inspection machines, a facility failure may be identified by referring to the failure history.

In FIG. 7, since the repair determination section 101, the recovery plan creation section 102, the output section 104, and the storage apparatuses 105 and 106 are identical to the elements described with reference to FIG. 1, the explanation will be omitted.

Figure 8:
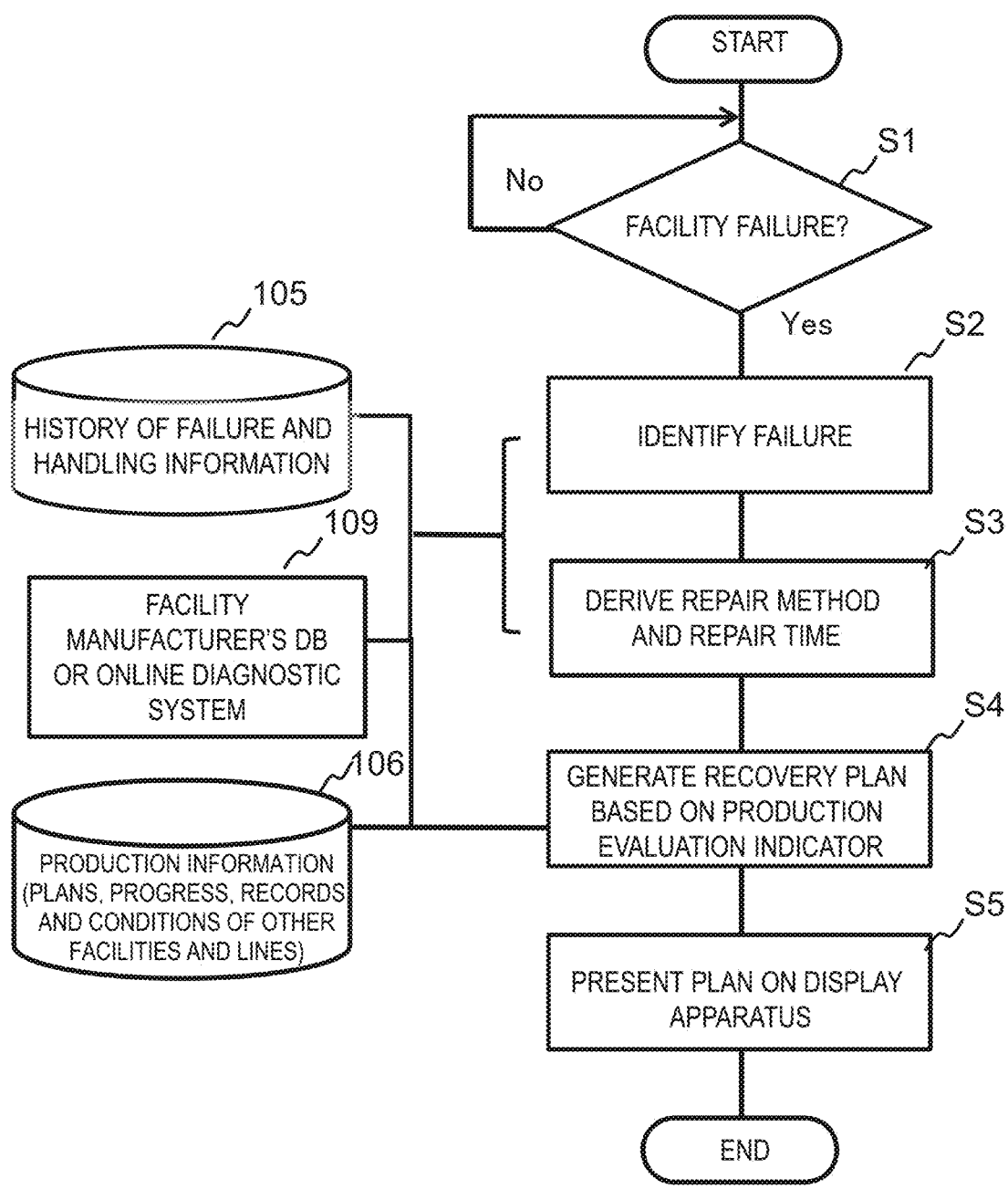
FIG. 8 is a diagram illustrating an operation of an example embodiment of the present invention.

FIG. 8 is a diagram illustrating an operation of the production management apparatus 100 in FIG. 7.

If the failure diagnosis section 107, which monitors a state of the facility 10 via the sensor 108, detects a failure (Yes in S1), the failure diagnosis section 107 identifies failure (S2). The repair determination section 101 derives a failure repair method and repair time by referring to the history of the failure and handling information in the storage apparatus 105 (S3).

The recovery plan creation section 102 refers to production information in the storage apparatus 105, and then creates a recovery plan (for instance, repair method, repair timing, production plan change proposal (replanning proposal)) (S4), based on a predetermined production evaluation indicator. The output section 104 outputs the recovery plan to a display apparatus (S5).

Figure 9:
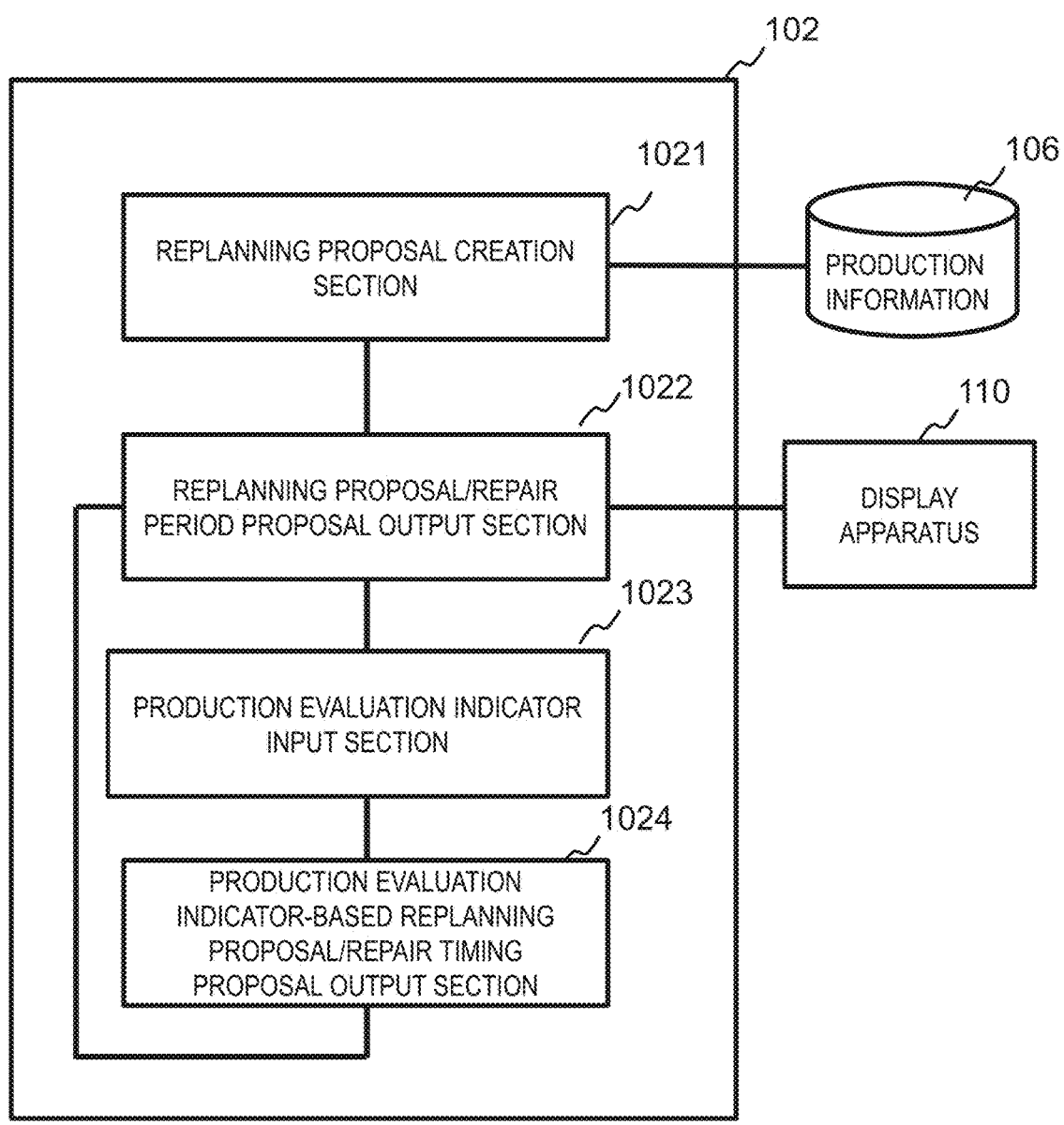
FIG. 9 is a diagram illustrating a configuration of a recovery plan creation section of an example embodiment of the present invention.

FIG. 9 is a diagram illustrating a configuration example of the recovery plan creation section 102 in FIG. 7. Referring to FIG. 9, the recovery plan creation section 102 includes a replanning proposal creating unit 1021 that creates a replanning proposal as a recovery plan, a replanning proposal/repair timing proposal output section 1022 that outputs a replanning proposal/repair timing proposal to a display apparatus 110, a production evaluation indicator input section 1023 that receives a production evaluation indicator selected by a user, and a production evaluation indicator-based replanning proposal/repair timing proposal output section 1024 that creates a replanning proposal/repair timing proposal based on the production evaluation indicator.

Figure 10:
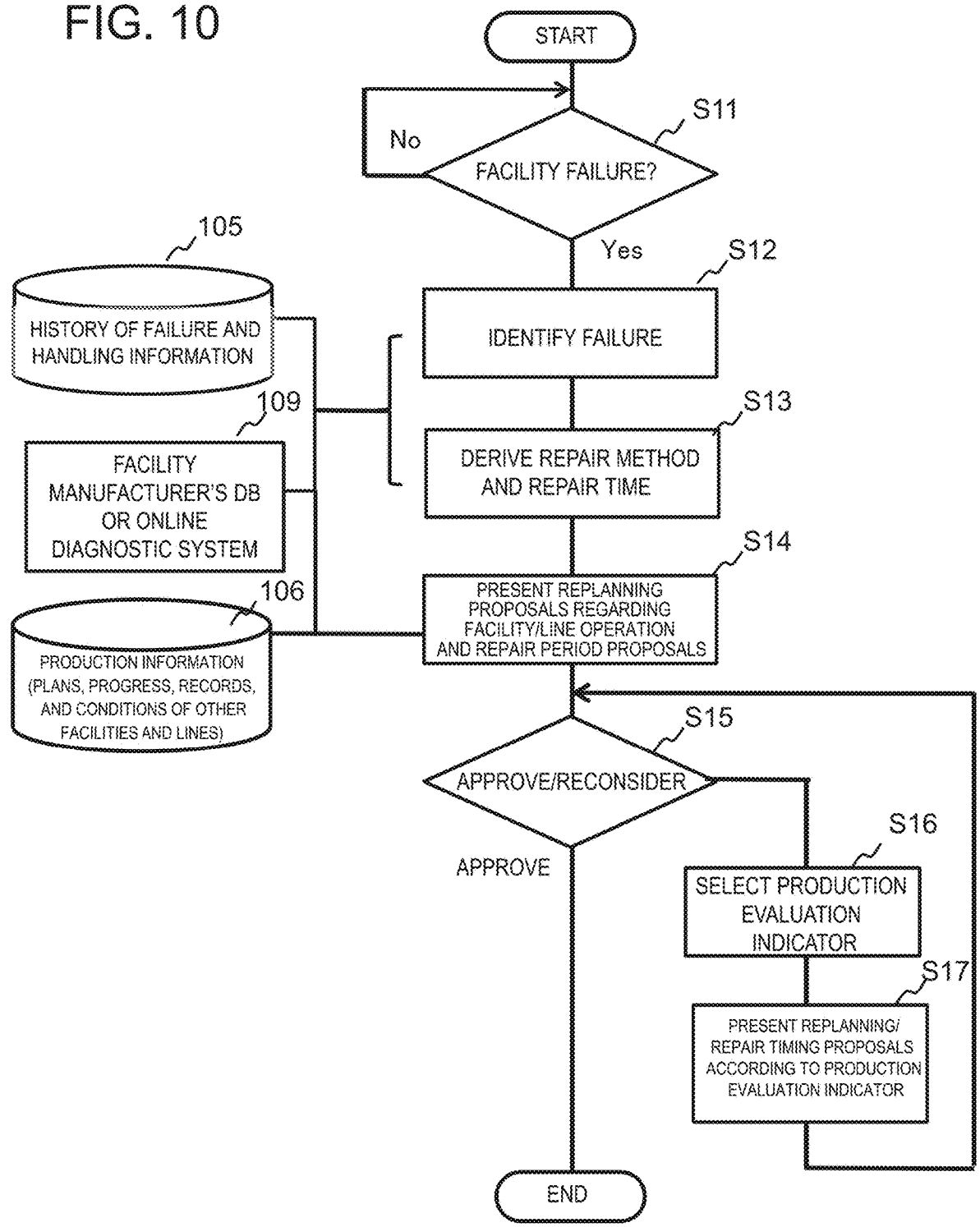
FIG. 10 is a diagram illustrating an operation of an example embodiment of the present invention.

FIG. 10 is a diagram illustrating the operation of the recovery plan creation section 102 in FIG. 9. Steps S14 to S17 in FIG. 10 correspond to processes (operation) of the recovery plan creation section 102 shown in FIG. 9. Since steps S11 to S13 in FIG. 10 correspond to the steps S1 to S3 in FIG. 8, respectively, the explanation will be omitted. Step S14 and steps thereafter in FIG. 10 will be described below.

The replanning proposal creating unit 1021 of the recovery plan creation section 102 generates replanning proposals regarding facility/line operation and repair timing options (candidates) (recovery plan options) based on the production information stored in the storage apparatus 106 (S14). The replanning proposal/repair timing proposal output section 1022 displays the replanning/repair timing options on the display apparatus 110.

If the user approves the displayed replanning proposal ("APPROVE" in S15), the process will stop.

If the user wants to revise the displayed replanning proposal ("RECONSIDER" in S15), the user will select a production evaluation indicator (S16).

The production evaluation indicator-based replanning proposal/repair timing proposal output section 1024 creates replanning/repair timing proposals (recovery plans) according to the production evaluation indicator, and the replanning proposal/repair timing proposal output section 1022 presents the replanning/repair timing options on the display apparatus 110 (S17).

Figure 11:
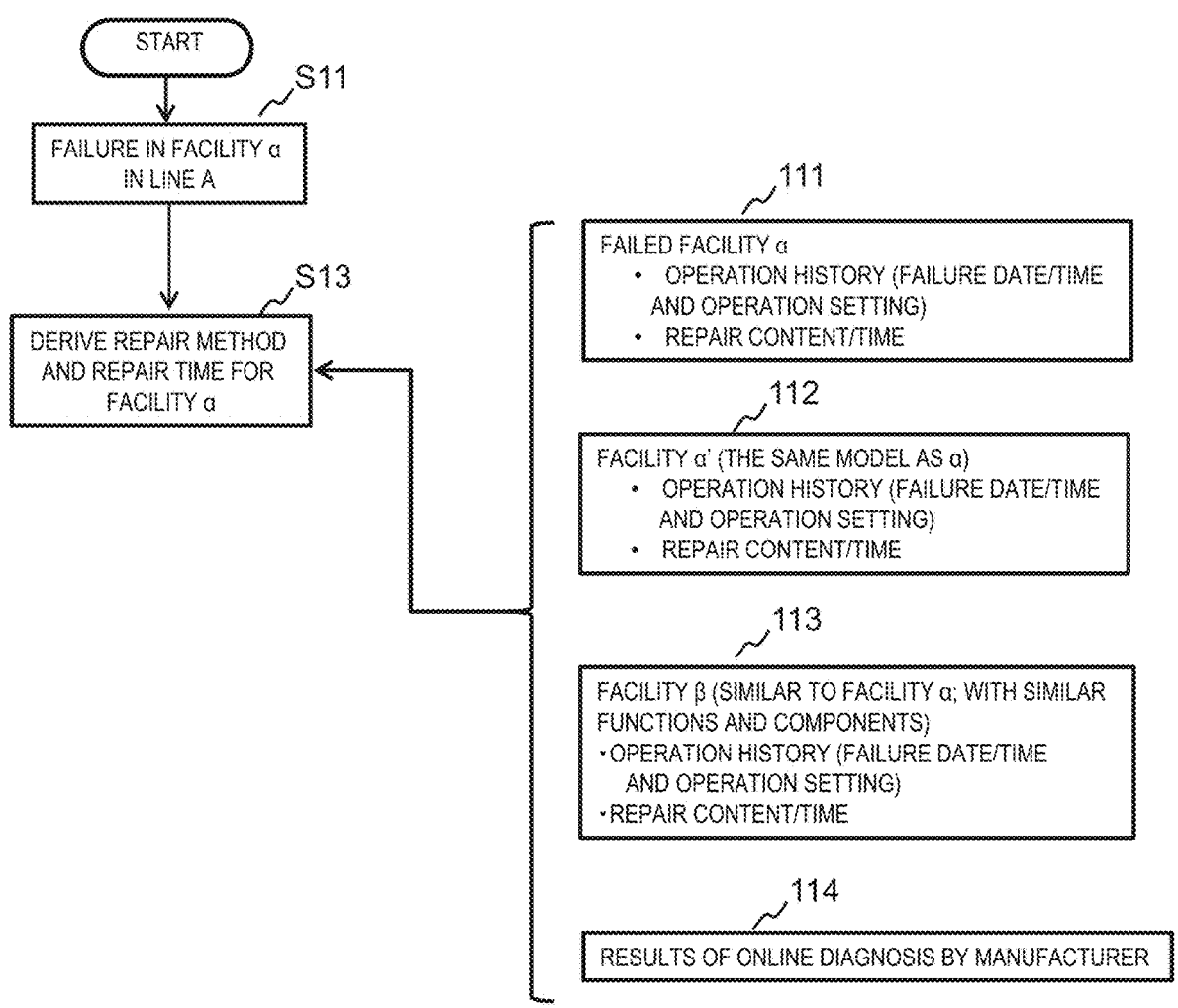
FIG. 11 is a diagram illustrating an operation of an example embodiment of the present invention.

FIG. 11 is a diagram for explaining FIG. 10 in more detail. When calculating a repair method and repair time for a failed facility α in the step S13, the repair determination section 101 may create operational replanning proposals and repair timing options for the failed facility, using at least one of the following as information items other than repair times out of the failure/handling information history in the storage apparatus 105:

information item 111: an operation history (failure date/time and operation setting) and repair content/time for a failed facility α;

information item 112: an operation history (failure date/time and operation setting) and repair content/time for a facility α' (same model as the facility α);

information item 113: an operation history (failure date/time and operation setting) and repair content/time for a facility β (similar to the facility α; with similar functions and components); and information item 114: result of online diagnosis by a facility manufacturer.

Online diagnosis by the facility manufacturer is performed by having the manufacturer connect to a facility in a production line via communication means and remotely diagnose facility failure.

Further, the information items 111 to 114 are stored in the storage apparatus 105 as the history of the failure/handling information.

The similarity between the facility α and β may be determined based on, for instance, a cosine similarity of vectors obtained by quantifying at least one set of the following data:

specification data of the facilities, functions, setting parameters for the facilities, and parameters of manufactured products (size such as length, width, and height, weight, the number of parts, etc.).

The storage apparatus 105 may store information items of not only the line A of the failed facility, but also of facilities of other line(s). Further, the facilities α, α', and β may not be currently operating or may not be owned by the operator. They may be lent out from another factory (of the same company or another company) or from the facility manufacturer.

Further, the information items may be preferentially searched in order from 111 to 113. If the information item 114 includes a repair time provided by the facility manufacturer, the information item 114 may be given the highest priority.

The repair determination section 101 may, as a matter of course, calculate the repair time, based on statistical processing (average value, and variance) applied on a history of repair time for failures.

The repair method, the repair time, and the repair timing determined by the repair determination section 101 are registered in the storage apparatus 105 as the failure/handling information history along with the failure information.

Figure 12:
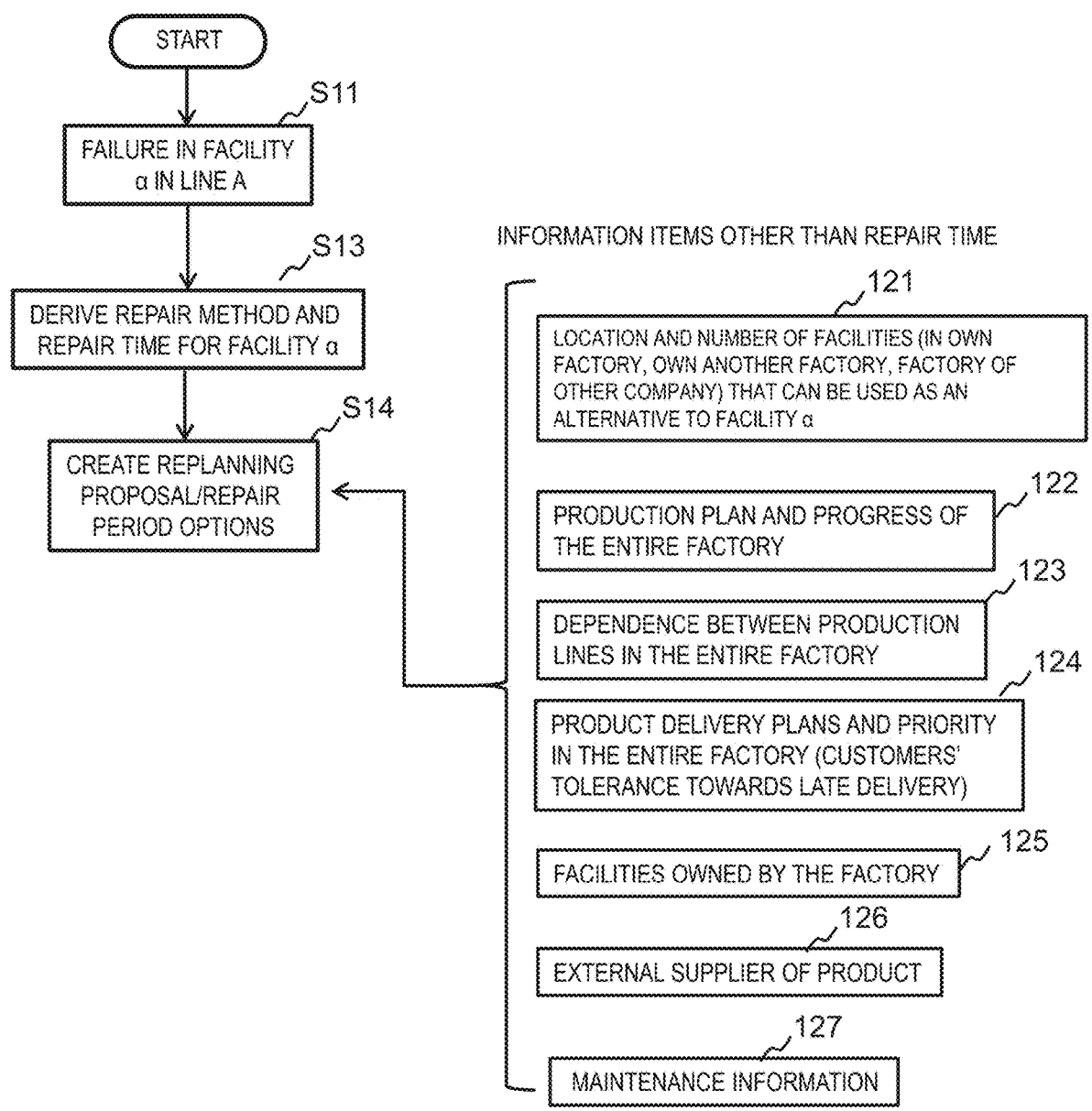
FIG. 12 is a diagram illustrating an operation of an example embodiment of the present invention.

Further, as illustrated in FIG. 12, a production plan change proposal (replanning proposal) and a repair timing candidate may be derived by referring to, for instance:

information item 121: location(s) and the number of available facilities (in an own factory, in an own another factory of, in a factory of other company) that can be used as an alternative to the facility α;

information item 122: production plan and progress of an entire factory (production plan for each product (how many pieces are manufactured by which line and until when) and progress information (how many have been manufactured so far));

information item 123: dependence between production lines in the entire factory (such as when products manufactured by a line X are run in a line Y, etc.);

information item 124: the product delivery plans and priority in the entire factory (customers' tolerance towards late delivery);

information item 125: facilities owned by the factory;

information item 126: an external supplier of the product; and information item 127: maintenance information (for instance, periodic maintenance for production lines, etc.)

as the production information stored in the storage apparatus 106. The information item 126 indicates an external supplier that can provide products to be delivered to a customer when such a supplier exists, and there is an option of ordering the product to the external supplier, from which products are supplied to the customer, if necessary. Note that the information items 121 to 127 are merely examples, and it is not absolutely required to have all the information items 121 to 127. Further, it goes without saying that example embodiments are not limited to the production information as illustrated in FIG. 12.

As described above, the repair determination section 101 may select an option of postponing a repair to the failed facility based on, for instance, maintenance information in the production information.

Figure 13:
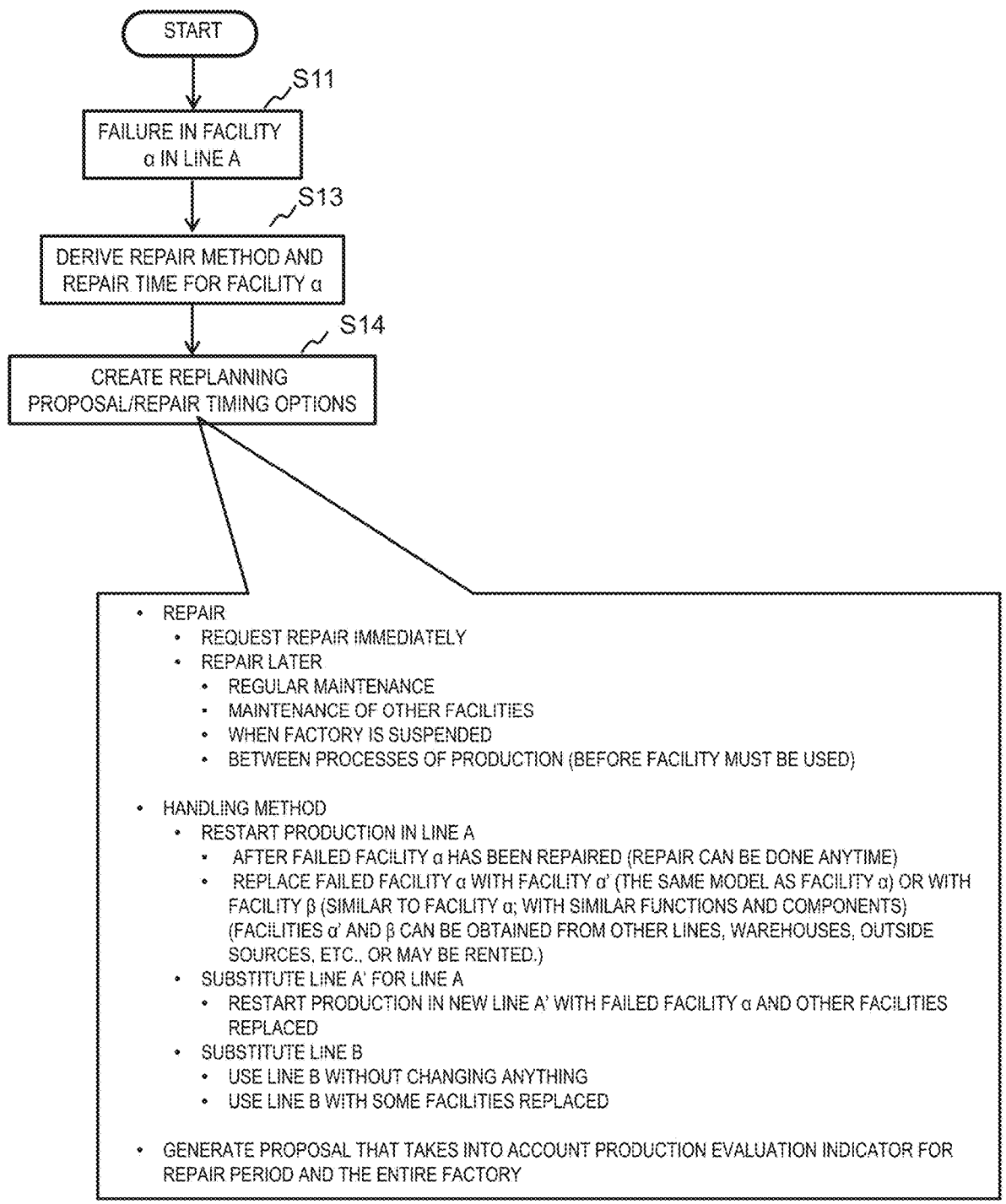
FIG. 13 is a diagram illustrating an operation of an example embodiment of the present invention.

FIG. 13 is a diagram illustrating an example of a recovery plan generated by the recovery plan creation section 102.

An example of a facility repair method presented by the recovery plan creation section 102 includes information as to whether to request repair immediately or repair later.

If the failed facility is repaired later, there are options of repairing it at periodic maintenance, maintenance of other facilities, when an operation in a factory is suspended, and in a period between productions (before the line is used next time).

Handling includes, for instance, restarting production of a product X in the line A;

changing a line A' for the line A to perform substituted production in the line A'; and performing substituted production in the line B.

When the production of the product X is restarted in the line A, restart it after the failed facility α has been repaired, or replace the failed facility α with the facility α' (the same model as the facility α) or with the facility β (similar to the facility α; with similar functions and components) (the facilities α' and β can be supplied from other lines, warehouses, outside sources, etc., or may be rented.)

When the line A is substituted with the line A', the production may be restarted in the line A' as a new production line A by replacing the failed facility α and other facilities includes in the old line A.

When the line B is used as an alternative production line, the production may be carried out with the line B without changing anything or some facilities of the line B replaced.

A proposal that takes into account the production evaluation indicator for a repair timing and an entire factory (all the lines in the factory) is generated. At this time, the recovery plan creation section 102 may generate a plan proposal that takes into account the production evaluation indicator for the entire factory using a rule-based method or machine learning.

FIG. 14 shows examples of proposals (proposals A to D), presented by the recovery plan creation section 102, taking into account the production evaluation indicator for the entire factory.

Proposal A: immediately request the repair of the facility. Wait for the line A to be restored and restart the production in the line A.

Proposal B: immediately request the repair of the facility.
As for production, both (1) and (2) below.
(1) Wait for the line A to be restored and restart the production in the line A.
(2) Perform alternate production 10% of what was planned in the line B four days later.

Proposal C: request the repair of the facility at periodic maintenance.
Start the production in the line C as an alternative line two days later.

Proposal D: request the repair of the facility when the production is over (at line reconfiguration).
As for production, carry out both (1) and (2) below.
(1) Replace the failed facility of the line A with an operational facility in the warehouse and restart production within two days.
(2) Perform alternate production 30% of what was planned in the line D three days later.

Figure 15:
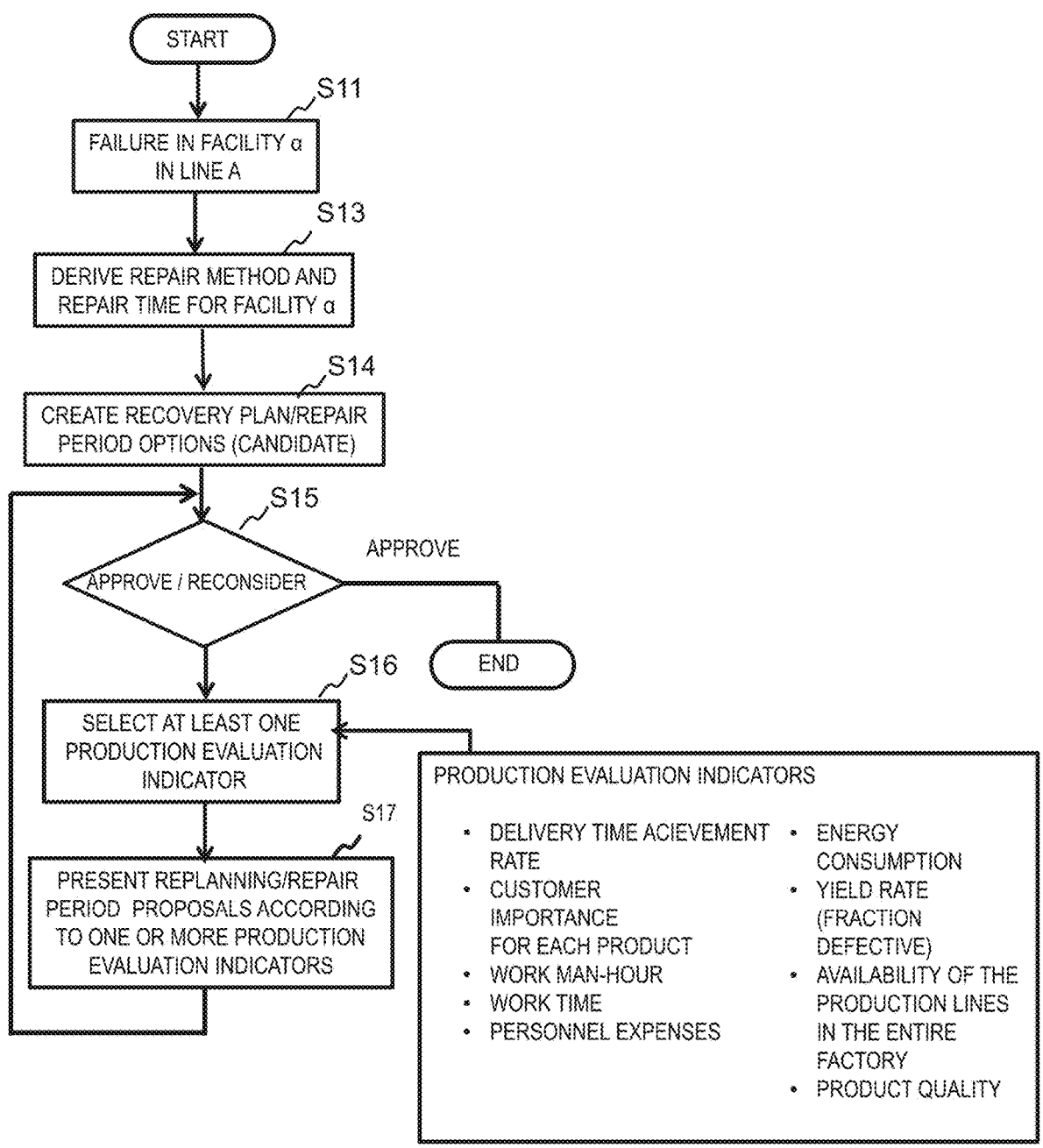
FIG. 15 is a diagram illustrating an operation of an example embodiment of the present invention.

FIG. 15 is a diagram illustrating an operation of an example embodiment. The steps S11 to S14 are the same as those in FIG. 10. When the user selects "RECONSIDER" in the step S15, the following production evaluation indicator options are displayed:
- on-time delivery rate
- customer importance degree for each product
- work man-hour
- work time
- personnel expenses
- energy consumption (power consumption)
- yield rate (fraction defective)
- availability in the entire factory
- product quality, etc.

The user then selects at least one of the production evaluation indicators (S16).

The recovery plan creation section 102 presents replanning/repair timing proposals according to one or more production evaluation indicators selected (S17).

Figure 16:
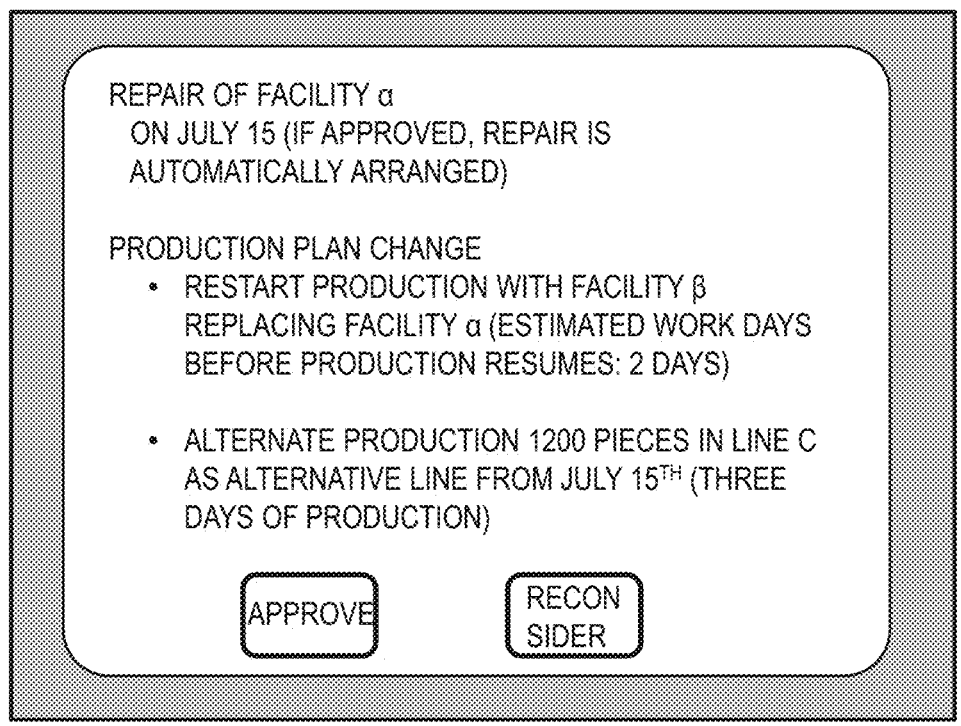
FIG. 16 is a diagram illustrating an example of a recovery plan display of an example embodiment of the present invention.

A display example 1 in FIG. 16 shows an example of a recovery plan (repair timing, repair method, and production plan change proposal) displayed on the display apparatus 110 in the step S14 in FIG. 15.

The failed facility α is repaired on July 15.

As a production plan change, the production is restarted with the facility β replacing the facility α (estimated work days before the production resumes: 2 days).

The alternate production of 1200 pieces are performed in the line C as an alternative line from July 15 (production dates is three days; 400 per day).

If "APPROVE" is selected on the display screen, repair arrangements will be made automatically by notifying maintenance personnel of the repair on July 15th via communication means.

By clicking on "APPROVE" or "RECONSIDER" button displayed on the screen, one of the options is selected. If "RECONSIDER" is clicked, the screen of FIG. 17A or 17B (display examples 2 and 3) is displayed.

Figure 17A:
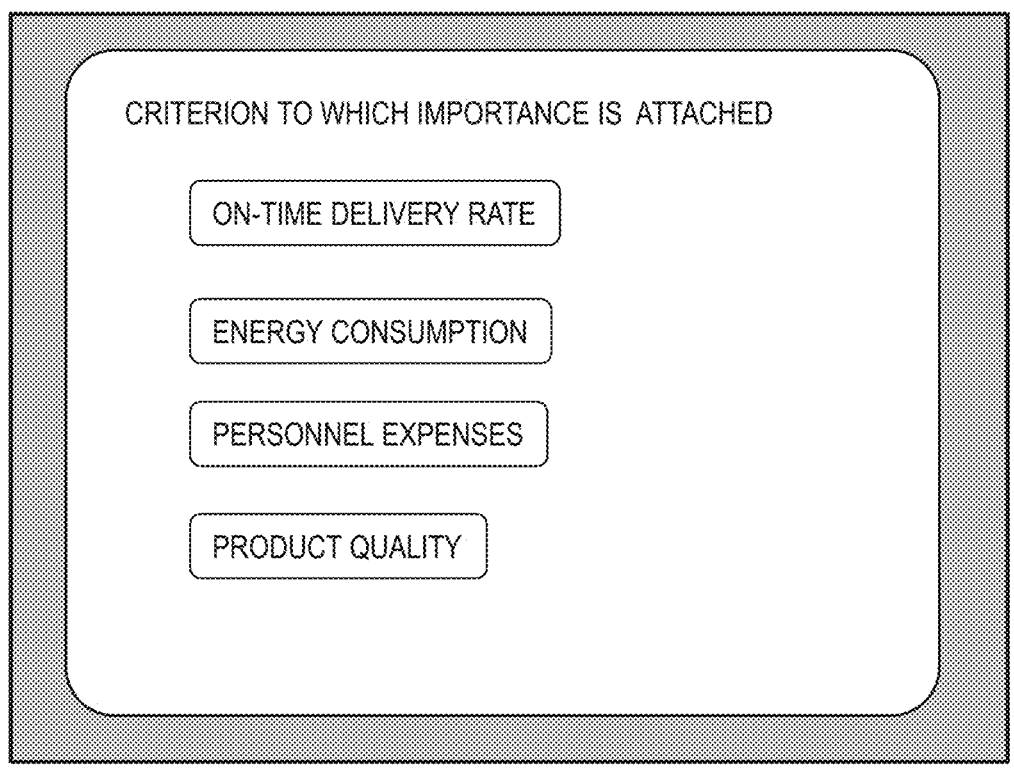
FIG. 17A is a diagram illustrating a display example of an example embodiment of the present invention.

When the user selects a production evaluation indicator to which importance is attached, with a click operation in the screen of FIG. 17A, the recovery plan creation section 102 creates a recovery plan (repair method, repair timing, and production plan change proposal) most suitable to the selected production evaluation indicator, and presents the plan on the display apparatus, like the display example 1 in FIG. 16.

Figure 17B:
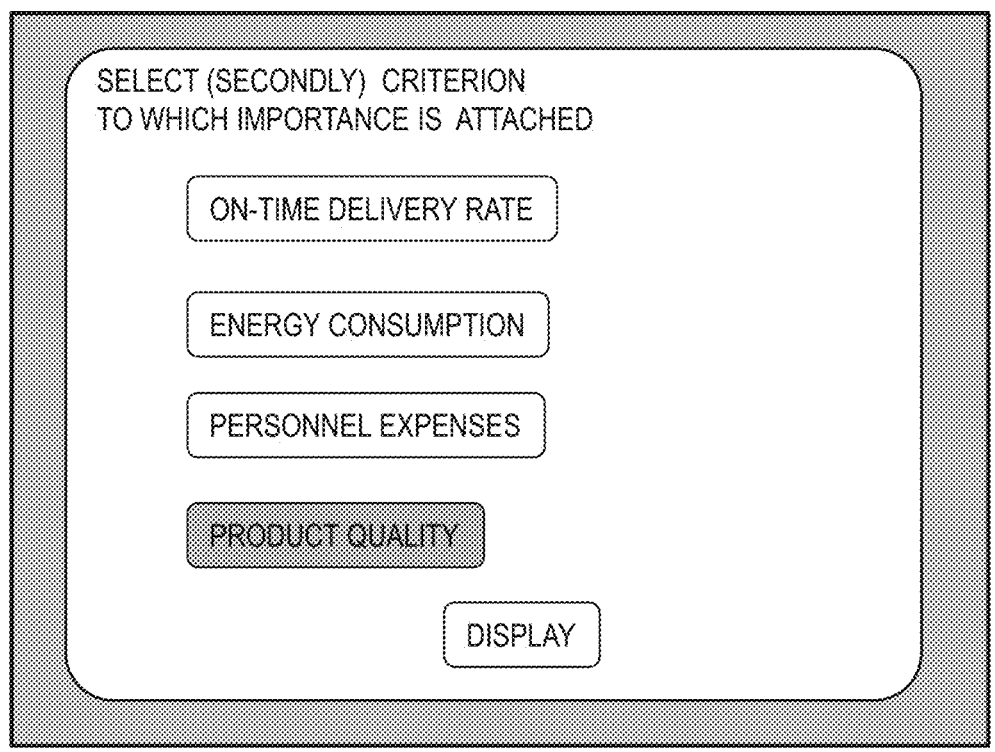
FIG. 17B is a diagram illustrating a display example of an example embodiment of the present invention.

In the display example 3 in FIG. 17B, a plurality of production evaluation indicators are selected. "PRODUCT QUALITY" is selected as the second production evaluation indicator in the display example 3. However, the user may be allowed to select three or more production evaluation indicators as well.

The recovery plan creation section 102 creates an optimized recovery plan (repair method, repair timing, and production plan change) based on the selected production evaluation indicators (on-time delivery rate, product quality, etc.) and presents the plan on the display apparatus (the display example 1).

When determining a production plan change proposal, the recovery plan creation section 102 may derive an optimal combination from the following by simulation and analysis regarding the production evaluation indicators.
- Alternate production using an alternative line (all or some products in the production plan);
- Replacing the facility (operate with the failed facility replaced with a normally operating facility);
- Wait for the facility to be restored.

For instance, a production plan change proposal that includes:
- No delivery time change (no change in on-time delivery rate);
- Low personnel expenses;
- Low energy consumption;
- Maintaining product quality; and
- Minimum defective product rate;

will be an optimal proposal option for the following production evaluation indicators:
- Delivery time achievement rate;
- Personnel expenses;
- Energy consumption;
- Product quality; and
- Yield rate.

Figure 18:
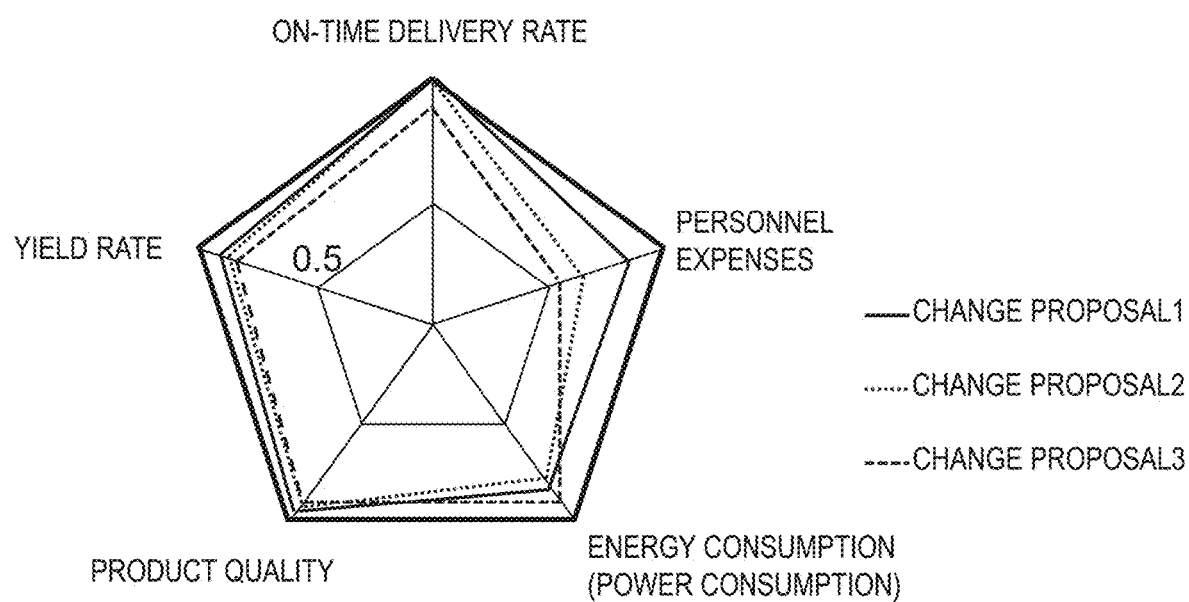
FIG. 18 is a diagram for explaining relationship between production plan change proposals and production evaluation indicators

For instance, on-time delivery rate, product quality and yield rate are normalized with values of the original production plan as 1 in a radar chart of FIG. 18. Further, personnel expenses and energy consumption are shown as reciprocals with values (reference values) of the original production plan normalized to 1. Therefore, if the personnel expenses are twice as much as the reference value, its value will be 0.5. Similarly, if the energy consumption is twice the reference value, its value will be also 0.5. In other words, the smaller the value, the more the personnel expenses and the energy consumption increase. In the example of FIG. 18, from three production plan change proposals, a change proposal 1, shown in solid line, having the highest score is selected based on the five production evaluation indicators. Alternatively, the output section 104 of the production management apparatus 100 may display a plurality of change proposals in order of score on the display apparatus 110.

According to the present example embodiment, when a facility fails during production, a recovery plan that takes into account a situation of an entire factory is generated for restoration (repair) of the failed facility. In generation of the recovery plan, repair content of the failed facility is taken into account to generate a recovery plan such that a production evaluation indicator for an entire factory becomes higher.

As described above, a facility failure causes a production loss such as repair and adjustment of other facilities. Therefore, the period in which the failed facility cannot be used is controlled. As a result, the production evaluation indicators (not only simple costs) for the entire factory can be improved.

When a facility fails in the factory, a method for repairing the failed facility is determined, a time required for the repair is determined (estimated, calculated, referred to), and a production plan change proposal is presented based on the production evaluation indicator using the handling method/time and the production information of available facilities and other facility/line. There may be a plurality of production lines.

Further, the output section 104 may present several options (alternatives) of recovery plans (production plan change proposals). Alternatively, a user may enter a criterion for creating options, and change proposal options based on the result (entered criterion) may be presented.

Variations of the example embodiment discussed above will be described below.

The failure diagnosis section 107 in FIG. 7 may connect to the sensor 108 via communication means to monitor a state of a facility. Alternatively, the failure diagnosis section 107 may perform estimation of a failure based on a feature value of a current waveform by monitoring the state of a facility. Alternatively, the failure diagnosis section 107 may detect not only a failure, but also a sign of failure based on a feature value or the like of a current waveform.

Figure 19:
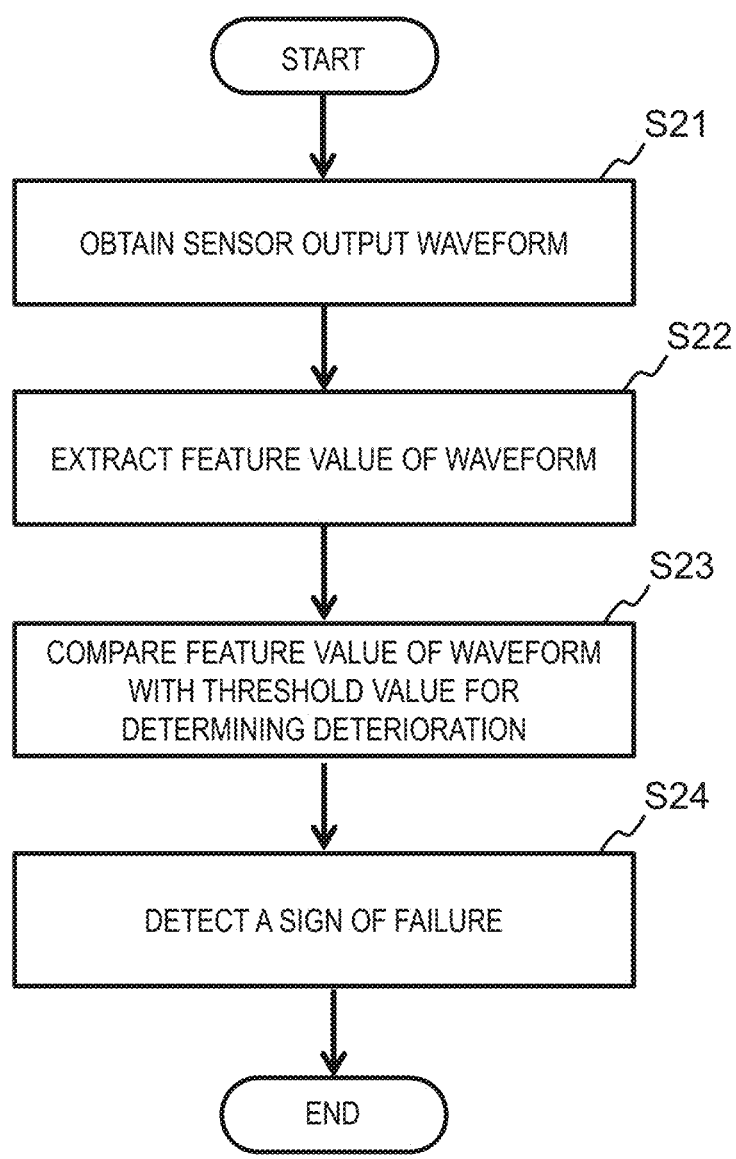
FIG. 19 is a diagram illustrating an operation of an example embodiment of the present invention.

FIG. 19 is a diagram illustrating an operation example of the step S2 (the operation of the failure diagnosis section 107) in FIG. 8.

The failure diagnosis section 107 obtains an output waveform from the sensor 108 (S21). The sensor 108 may be a current sensor or vibration sensor. The failure diagnosis section 107 extracts a feature value of the obtained waveform (S22). The failure diagnosis section 107 may transform the obtained waveform into a frequency domain using a fast Fourier transform (FFT) or discrete Fourier transform (DFT), and calculate a feature value based on calculation result of the frequency spectrum. The failure diagnosis section 107 may use a short-time Fourier transform, in which a Fourier transformation is performed while a window function is slid along the time axis. For instance, as the feature value of the current from the current sensor, a square root of a sum of squares of amplitudes of harmonic frequency components (with a commercial AC (alternate current) power supply frequency set as a fundamental frequency) may be used, or a feature value of higher frequency components may be extracted by filtering the current from the current sensor. Further, the feature value may be extracted from a shape of a waveform (current peak value, root mean square (RMS), crest value, etc.) or a waveform pattern on a time axis, or a waveform itself may be used.

The failure diagnosis section 107 compares an extracted feature value with a threshold value for determining a deterioration state of a facility (S23). When the feature value is a waveform, the failure diagnosis section 107 may compare the waveform with a waveform pattern for determining a deterioration state of a facility. The failure diagnosis section 107 may detect a sign of failure when the extracted feature value exceeds a threshold value defined as a level indicating a sign of failure (S24). Further, the failure diagnosis section 107 may be configured to identify a location of a facility failure or a defective part (element) based on an analysis result of the waveform.

When a sign of failure is detected, the repair determination section 101 calculates when the deterioration level of the facility will reach a failure level based on data showing a temporal transition of facility deterioration or a prediction, and the repair determination section 101 may postpone a repair of the facility failure in the line and carry out the repair during a maintenance period of the line or at the same time as a maintenance period of another line if the period when the facility reaches a failure level overlaps the maintenance period of the line (for instance, periodic maintenance period) or the maintenance period of another line. As a result, it becomes possible to reduce the number of production line stoppages in an entire factory, compared with a case where a line is stopped each time a facility therein fails in order to repair the facility.

Figure 20:
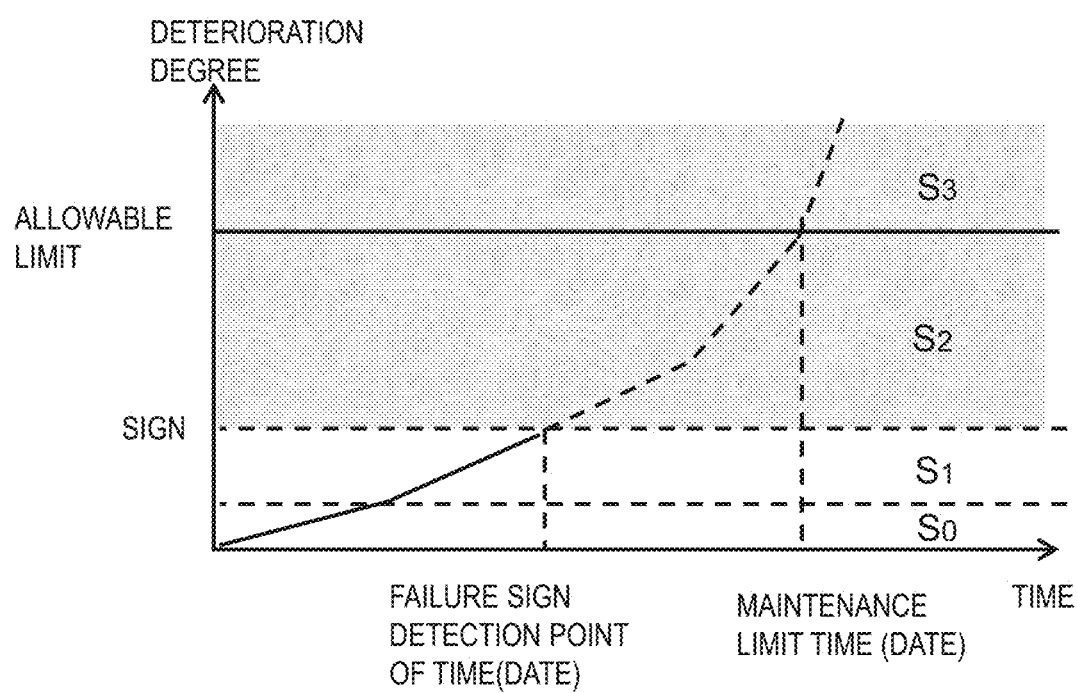
FIG. 20 is a diagram for explaining another example embodiment of the present invention.

FIG. 20 is a diagram schematically showing the deterioration of the facility 10 detected by the failure diagnosis section 107 in FIG. 7. A horizontal axis represents time and a vertical axis represents deterioration (indicating the degree of deterioration). Note that a scale of time before failure sign detection point (time between an origin and a failure sign detection point) is shortened (compressed) as compared with that of time after the failure sign detection point in the time axis of FIG. 20.

The deterioration of a facility may be derived based on the fraction defective (reduced yield rate, etc.) of products manufactured by the facility. In FIG. 20, when a degree of deterioration reaches a sign level, a sign of failure is detected. The failure diagnosis section 107 compares a feature value of the waveform obtained by the sensor 108 with a threshold value for determining a deterioration of the facility, and this threshold value corresponds to the sign as the degree of deterioration in FIG. 20.

The repair determination section 101 may be configured to predict when a deterioration of the facility 10 may exceed an allowable limit (a maintenance limit time in FIG. 20) when the failure diagnosis section 107 detects a sign of failure in the facility 10. The repair should be done before the maintenance limit time, however, the repair may be postponed until a start of a periodic maintenance for the line, if the production information (maintenance information) stored in the storage apparatus 106 indicates that a time interval of the periodic maintenance temporally overlaps with a time interval (grace period) between the failure sign detection point and the maintenance limit time, or the time interval of the periodic maintenance temporally overlaps with the maintenance limit time.

In FIG. 20, preventive maintenance during a normal state and maintenance for a failure can be treated as a stochastic process (for instance, Markov Decision Process: MDP). A deterioration degree of a facility is divided into a plurality of stages $L+1$. Though not limited thereto, FIG. 20 shows an example where $L=3$, $L+1=4$ stage (for instance, state $S_0$ is normal, state $S_1$ a start of deterioration, state $S_2$ a sign of failure, and $S_3$ a failure state), however, the following is also possible: $L=2$, $L+1=3$ stages ($S_1$: deterioration is below a sign of failure; $S_2$: between a sign of failure and the allowable limit; $S_3$: beyond an allowable limit). Let's say a probability of state $S_i$ transitioning to state $S_j$ due to a maintenance plan (action) k (k=1 to K) applied thereto is $q_{ij}(k)$. The probability of selecting a maintenance plan (repair method) k in the state $S_i$ is $D_{ik}$, and a cost of the maintenance plan k is $W_{ik}$. A probability (transition probability) $p_{ij}$ of a facility in the state $S_i$ transitioning to the state $S_j$ is given by the following.

$$p_{ij}=\Sigma_{k=1}^{K}q_{ij}(k)D_{ik} \quad (17)$$

A steady-state probability $\pi_j$ of state j is given as follows.

$$\pi_j \geq 0 \; j=0,\ldots,L$$

$$\pi_j=\Sigma_{i=0}^{L}\pi_i p_{ij} \; j=0,\ldots,L \quad (18)$$

(where $\Sigma_{i=0}^{L}\pi_i=1$)

$$X_{jk}=\pi_j D_{jk} \quad (19)$$

With the above (19), the below is formulated as a Linear Programming (LP) problem.

Minimize $\Sigma_{j=0}^{L}\Sigma_{k=1}^{K}W_{jk}x_{jk}$ subject to $x_{jk} \geq 0$ j=0, . . . , L,k=1, . . . , K $\Sigma_{k=1}^{K}x_{jk}=\Sigma_{i=0}^{L}\Sigma_{k=1}^{K}q_{ij}(k)x_{ik}$ j=0, . . . , J $$\Sigma_{j=1}^{L}\Sigma_{k=1}^{K}x_{ij}=1 \quad (20)$$

Further, with $W_{jk}$ as a profit, the expression (20) above becomes the maximization of $\Sigma_j\Sigma_k W_{jk}x_{jk}$.

An optimal maintenance plan $D_{jk}$ may be derived by solving the expression (20) and with the expression below.

$$D_{jk} = \frac{x_{jk}}{\sum_{k=1}^{K} x_{jk}} \quad (21)$$

Further, the Markov decision process described above can be applied to the two states $S_0$ (operating) and $S_1$ (failure: repair state) in FIG. 6.

The following further describes various variations.

The repair determination section 101 may specify a method for handling a failure (notifying a facility manufacturer of a failure, requesting repair, etc.) and a time needed to handle the failure.

Further, past troubleshooting information and know-how information such as average work amount/time for troubleshooting may be accumulated and visualized.

The repair determination section 101 may identify a failure in a facility and obtain a repair method by connecting to a facility manufacturer via communication means and referring to a database of the facility manufacturer.

The repair determination section 101 may diagnose a failure of a facility by connecting to the facility manufacturer via communication means, remotely log on to an online diagnosis application running on a server or the like provided on a side of the facility manufacturer, and entering a command in the online diagnosis application from the repair determination section 101.

The recovery plan creation section 102 may be configured to determine whether it is possible to execute a plan change proposal using a production simulator.

Further, in addition to replacement of a facility provided in a line and allotment of a product to another line, a new line may be remade.

Further, when performing alternative production in an alternative line, production may be allocated further to another line depending on a load of the alternative line.

The output section 104 may display only one production evaluation indicator or a plurality of them according to their rankings. The best proposal may be displayed for each index. Alternatively, one proposal may be presented with a combination of several indicators according to rankings for each production evaluation indicator or may be presented according to the rankings.

A replanning proposal may be modified by a user who takes a look at the recovery plan presented on the display apparatus 110.

Further, the recovery plan creation section 102 may generate a replanning proposal and evaluate the proposal based on the production evaluation indicator responsive to selection and input of the production evaluation indicator.

Figure 21A:
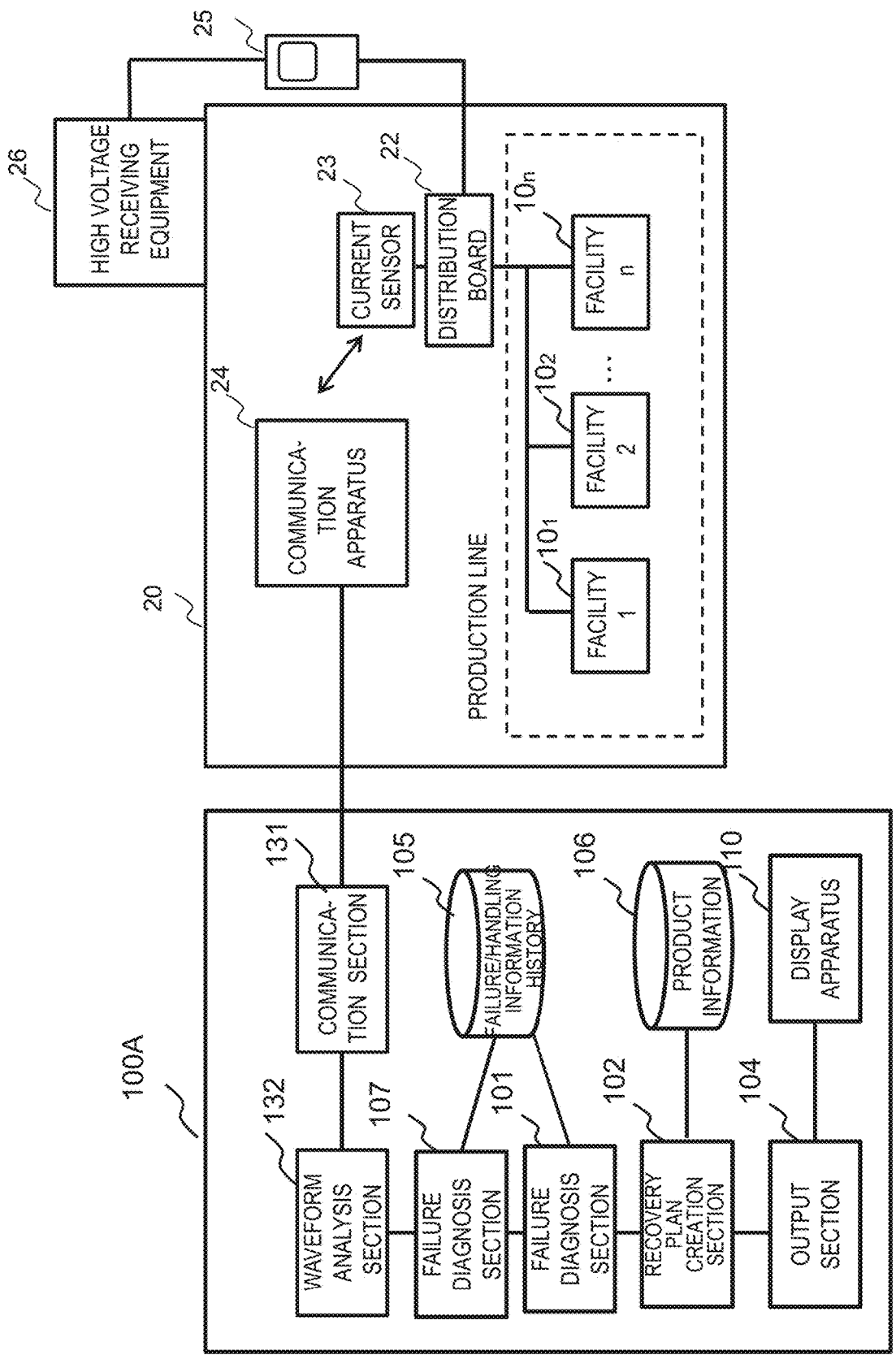
FIG. 21A is a diagram illustrating a configuration of another example embodiment of the present invention.

FIG. 21A is a diagram illustrating a variation of the production management apparatus 100. Referring to FIG. 21A, a production management apparatus 100A includes a communication section 111 that communicates with a communication apparatus 24 of a factory and a waveform analysis section 132 that performs device-disaggregation by analyzing a power supply current waveform of a production line obtained by the communication section 131 to disaggregate the power supply current waveforms into an individual current waveform of each facility. The failure diagnosis section 107 extracts a feature value from the current waveform of a facility based on the waveform of each facility disaggregated by the waveform analysis section 132. The feature value of the current waveform may be a waveform pattern, or a value based on frequency spectrum components obtained by transforming the current waveform into a frequency domain using a Fourier transform.

A high voltage receiving equipment 26 in a building 20 such as a factory performs voltage conversion, and power is supplied to facilities 1 to n ($10_1$ to $10_n$) of a production line from a main breaker or a branch breaker, which are not shown, of a distribution board 22. A current sensor 23 that detects a current flowing through the main breaker or branch breaker detects a current flowing through the line. The current sensor 23 transmits the obtained power supply current waveform to the communication apparatus 24. The current sensor 23 may be constituted by a CT (Current Transformer (for instance, Zero-phase-sequence Current Transformer (ZCT)) or a hall element. The current sensor 23 may sample and convert a current waveform (analog signal) into a digital signal using an analog-to-digital converter (not shown), compress and encode the digital signal using an encoder (not shown), and then wirelessly transmit the signal to the communication apparatus 24 via Wi-SUN (Wireless Smart Utility Network), for example. Alternatively, the communication apparatus 24 may obtain meter reading data (power consumption, etc.) of a smart meter 25 via, for instance, a B route. The meter reading data (power consumption, current value, etc.) obtained by the communication apparatus 24 from the smart meter 25 via the B route includes information on a power consumption of the entire building. The communication section 131 of the production management apparatus 100A receives the current waveform from the communication apparatus 24.

Figure 21B:
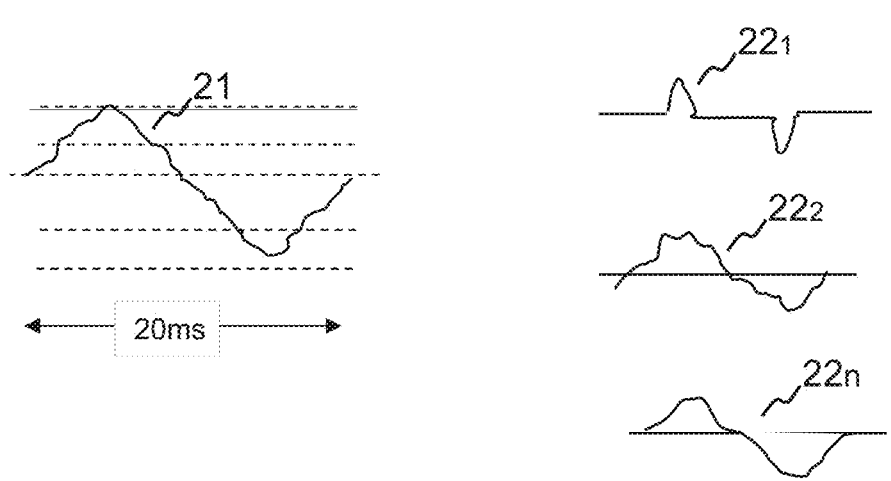
FIG. 21B is a diagram illustrating a configuration of another example embodiment of the present invention.

FIG. 21B is a diagram illustrating power supply current waveforms (total power supply current) of a production line obtained by the current sensor 23. The waveform analysis section 132 may disaggregate a power supply current waveform data (composite waveform) 21 in FIG. 21B obtained by the communication section 131 into individual power supply current waveforms of different facilities using a disaggregation technique described in, for instance, Non-Patent Literature 2. Waveforms $22_1$, $22_2$, and $22_n$ in FIG. 21B indicate the individual power supply current waveforms (separated waveforms) disaggregated by the waveform analysis section 132 for each of facilities 1, 2, and n.

Figure 22:
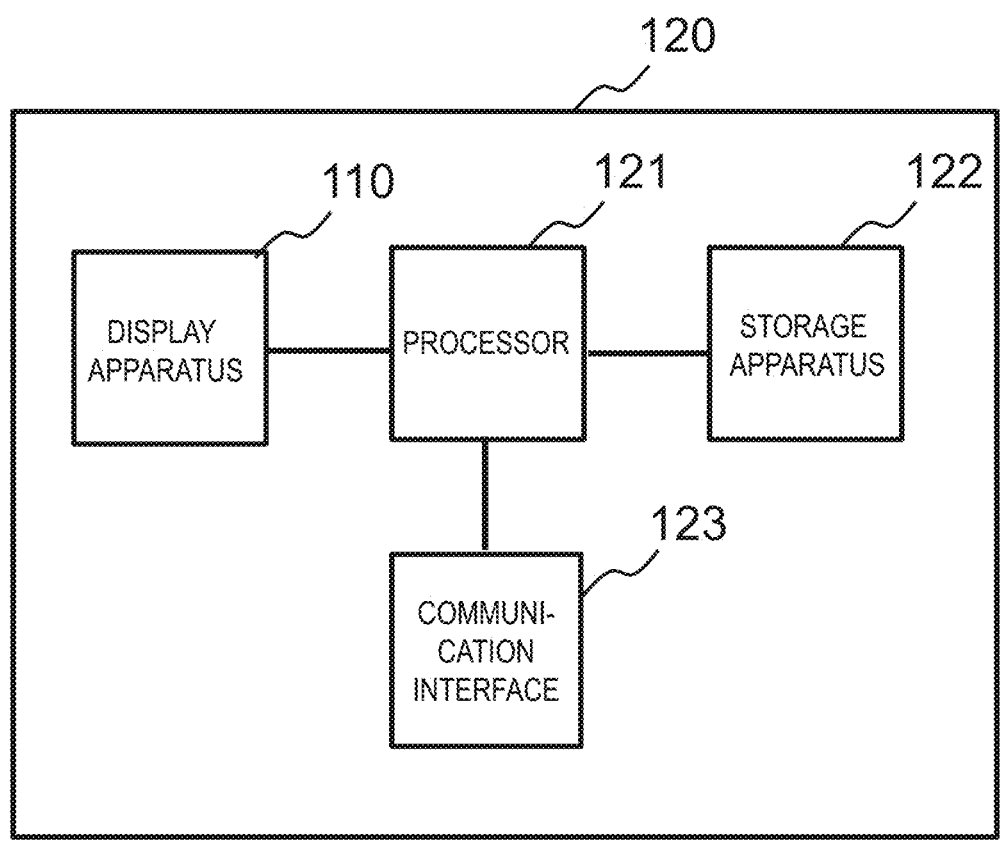
FIG. 22 is a diagram illustrating a configuration of another example embodiment of the present invention.

Further, for instance, the production management apparatus 100 (100A) may be implemented on a computer system as shown in FIG. 22. Referring to FIG. 22, a computer system 120 such as a server computer includes a processor (CPU (Central Processing Unit), data processing device) 121, a storage apparatus 122 that includes at least one of a semiconductor memory (for instance RAM (Random Access Memory), ROM (Read Only Memory) or EEPROM (Electrically Erasable and Programmable ROM), etc.), HDD (Hard Disk Drive), CD (Compact Disc), or DVD (Digital Versatile Disc), a display apparatus 110, and a communication interface 123 that communicates with an external storage apparatus that stores the production information, a terminal, etc. The apparatus 100 (100A) of the example embodiments described above may be realized by having the storage apparatus 122 store a program realizing processing of the repair determination section 101, the recovery plan creation section 102, etc., and having the processor 121 read and execute the program. The computer system 120 may be implemented as a cloud server that provides a client with a recovery plan providing service as a cloud service. It is a matter of course that the storage apparatus 122 may be the same device as the storage apparatuses 105 and 106 in FIG. 1.

As discussed, when a facility in a production line fails during product manufacturing and the products scheduled to be manufactured in the line that includes the failed facility is allocated to another line, there is a case that due to a setup change for the alternative line, a waiting time caused by adjustment of facility parameter(s), etc., and a difference in a production capacity, a better recovery plan may be to repair the failed facility in the original line and then restart the production in the original line, in terms of an yield rate. Further, when the production is allocated to an alternative line, the production capacity and availability of the alternative line may turn out not to be enough or a fraction defective (an yield rate) of the products may not meet an expected value, and as a result, a delivery of the products manufactured in the alternative line may be delayed. According to each of the example embodiments described above, it becomes possible to present a better recovery plan from a standpoint of, for instance, production management, by creating a recovery plan that aims to optimize an overall production plan that includes other lines, which may become a candidate(s) of the alternative production line.

Further, each disclosure of Patent Literature 1 and Non-Patent Literature 1 cited above is incorporated herein in its entirety by reference thereto. It is to be noted that it is possible to modify or adjust the example embodiments or examples within the whole disclosure of the present invention (including the claims) and based on the basic technical concept thereof. Further, it is possible to variously combine or select a wide variety of the disclosed elements (including the individual elements of the individual claims, the individual elements of the individual examples and the individual elements of the individual figures) within the scope of the claims of the present invention. That is, it is self-explanatory that the present invention includes any types of variations and modifications to be done by a skilled person according to the whole disclosure including the claims, and the technical concept of the present invention.

The example embodiments above can be described as the following supplementary notes (though not limited thereto).
(Supplementary Note 1)
A production management apparatus comprising:
a repair determination section that determines, based on failure information on the facility for manufacturing a product, a repair time required to repair the facility; and
a recovery plan creation section that creates a recovery plan in accordance with a predetermined production evaluation indicator, based on the repair time and production information on a line with the failed facility, one or more other relevant facilities, and on one or more other relevant lines.
(Supplementary Note 2)
The production management apparatus according to Supplementary Note 1, wherein the recovery plan creation section presents the recovery plan created, and with regard to the recovery plan, re-creates a recovery plan adapted to one or more of the production evaluation indicators that a user selects and re-presents the recovery plan re-created.
(Supplementary Note 3)
The production management apparatus according to Supplementary Note 1 or 2, wherein the failure is one that occurs during when the product is manufactured in the line equipped with the facility.
(Supplementary Note 4)
The production management apparatus according to any one of Supplementary Notes 1 to 3, comprising
a storage apparatus that stores a failure history of the facility and a repair history including repair content done for the failure and repair time, wherein
the repair determination section determines a repair method and a repair time for the facility, based on
(A) the failure and repair histories of the facility,
(B) the failure and repair histories of one or more facilities of a type identical or similar to the facility, or
(C) a result of online diagnosis by a facility manufacturer, or
a combination of at least two of (A) to (C) above.
(Supplementary Note 5)
The production management apparatus according to Supplementary Note 4, wherein
the repair method includes any of the following:
replacing or adjusting one or more parts constituting the facility, or
replacing or adjusting a unit including the one or more parts, and replacing the facility.
(Supplementary Note 6)
The production management apparatus according to Supplementary Note 4 or 5, wherein the repair determination section determines the method for repairing the facility based on an availability of the facility.
(Supplementary Note 7)
The production management apparatus according to any one of
Supplementary Notes 4 to 6, comprising:
a storage apparatus that stores information including:
a product manufactured in each line,
a production capacity of the each line, and
a production plan and maintenance plan as the production information, wherein
the recovery plan creation section creates a production plan change proposal that changes the production plan for the line including the failed facility or production plans for the line including the failed facility and one or more another lines, based on
the repair method and the repair time;
at least any one of a production capacity of the line, a progress of a production plan, delivery information, and a maintenance plan; and
the production evaluation indicator,
and presents the production plan change proposal, as the recovery plan with a repair timing.
(Supplementary Note 8)
The production management apparatus according to any one of Supplementary Notes 1 to 7, wherein the recovery plan creation section presents a production plan change proposal as the recovery plan, including any one of:
postponing a repair work until a predetermined time without immediately repairing the failed facility;
stopping the line including the failed facility and restart production in the line after repairing the failed facility;

replacing, in the line including the failed facility, the failed facility with a facility of an identical type or similar one and restarting the production in the line;

stopping the line including the failed facility, repairing the facility, and allocating products manufactured in the line to another line; and configuring a new line, and manufacturing products manufactured in the line including the failed facility in the new line.

(Supplementary Note 9)

The production management apparatus according to any one of Supplementary Notes 1 to 8, further comprising a failure diagnosis section that obtains a state of the facility and diagnoses a failure of the facility from the state of the facility.

(Supplementary Note 10)

The production management apparatus according to Supplementary Note 8, wherein the failure diagnosis section predicts an occurrence timing of a failure of the facility based on a degree of deterioration thereof, and the recovery plan creation section creates the recovery plan based on the prediction of the occurrence timing of the failure of the facility.

(Supplementary Note 11)

The production management apparatus according to Supplementary Note 10, wherein the repair determination section sets a repair timing for the facility, in a period of time in which a grace period until a maintenance limit time of the facility derived by the failure diagnosis section temporally overlaps with a periodic maintenance.

(Supplementary Note 12)

A computer-based production management method, the method comprising:

determining, based on failure information on a facility for manufacturing a product, a repair time required to repair the facility; and creating a recovery plan in accordance with a predetermined production evaluation indicator based on the repair time and production information on a line with the failed facility, one or more other relevant facilities, and on one or more other relevant lines.

(Supplementary Note 13)

The production management method according to Supplementary Note 12, comprising:

presenting the created recovery plan; and with regard to the recovery plan, re-creating and re-presenting a recovery plan adapted to at least one of the production evaluation indicators selected by a user.

(Supplementary Note 14)

The production management method according to Supplementary Note 12 or 13, wherein the failure is one that occurs during when the product is manufactured in the line equipped with the facility.

(Supplementary Note 15)

The production management method according to any one of Supplementary Notes 12 to 14, comprising:

with reference to a storage apparatus that stores a failure history of the facility and a repair history including repair content done for the failure and repair time, determining a repair method and a repair time for the facility, based on (A) the failure and repair histories of the facility, (B) the failure and repair histories of one or more facilities of a type identical or similar to the facility, or (C) a result of online diagnosis by a facility manufacturer, or a combination of at least two of (A) to (C) above.

(Supplementary Note 16)

The production management method according to Supplementary Note 15, wherein the repair method includes any of the following:

replacing or adjusting one or more parts constituting the facility;

replacing or adjusting one or more units including the parts; and replacing the facility.

(Supplementary Note 17)

The production management method according to Supplementary Note 15 or 16, comprising determining the repair method for repairing the facility based on an availability of the facility.

(Supplementary Note 18)

The production management method according to any one of Supplementary Notes 12 to 17, comprising:

with reference to a storage apparatus that stores information including:

a product manufactured in each line, a production capacity of the each line, and a production plan and maintenance plan as the production information, creating a production plan change proposal that changes the production plan for the line including the failed facility or production plans for the line including the failed facility and one or more another lines, based on the repair method and the repair time;

at least any one of a production capacity of the line, a progress of a production plan, delivery information, and a maintenance plan; and the production evaluation indicator, and presents the production plan change proposal, as the recovery plan with a repair timing.

(Supplementary Note 19)

The production management method according to any one of Supplementary Notes 12 to 18, comprising presenting a production plan change proposal as the recovery plan, including any one of:

postponing a repair work until a predetermined time without immediately repairing the failed facility;

stopping the line including the failed facility and restart production in the line after repairing the failed facility;

replacing, in the line including the failed facility, the failed facility with a facility of an identical type or similar one and restarting the production in the line;

stopping the line including the failed facility, repairing the facility, and allocating products manufactured in the line to another line; and configuring a new line, and manufacturing products manufactured in the line including the failed facility in the new line.

(Supplementary Note 20)

The production management method according to any one of Supplementary Notes 12 to 19, comprising obtaining a state of the facility and diagnosing a failure of the facility from the state of the facility.

(Supplementary Note 21)

The production management method according to Supplementary Note 20, comprising:

predicting an occurrence timing of a failure of the facility based on a degree of deterioration thereof; and creating the recovery plan based on the prediction of the occurrence timing of the failure of the facility.

(Supplementary Note 22)

The production management method according to Supplementary Note 21, comprising
setting a repair timing for the facility, in a period of time in which a grace period until a maintenance limit time of the facility derived by the failure diagnosis section temporally overlaps with a periodic maintenance.

(Supplementary Note 23)

A non-transitory computer readable medium storing a program causing a computer to execute processing comprising:
determining, based on failure information on a facility for manufacturing a product, a repair time required to repair the facility; and
creating a recovery plan in accordance with a predetermined production evaluation indicator based on the repair time and production information on a line with the failed facility, one or more other relevant facilities, and on one or more other relevant lines.

(Supplementary Note 24)

The non-transitory computer readable medium according to Supplementary Note 23, wherein the processing comprises:
creating the recovery plan and presenting the created recovery plan; and
re-creating and re-presenting a recovery plan adapted to at least one of the production evaluation indicators selected by a user.

(Supplementary Note 25)

The non-transitory computer readable medium according to Supplementary Note 23 or 24, wherein the failure is one that occurs during when the product is manufactured in the line equipped with the facility.

(Supplementary Note 26)

The non-transitory computer readable medium according to any one of Supplementary Notes 23 to 25, wherein the processing comprises:
with reference to a storage apparatus that stores a failure history of the facility and a repair history including repair content done for the failure and repair time, wherein
determining a repair method and a repair time for the facility, based on
(A) the failure and repair histories of the facility,
(B) the failure and repair histories of one or more facilities of a type identical or similar to the facility, or
(C) a result of online diagnosis by a facility manufacturer, or
a combination of at least two of (A) to (C) above.

(Supplementary Note 27)

The non-transitory computer readable medium according to Supplementary Note 25, wherein
the repair method includes any of the following:
replacing or adjusting one or more parts constituting the facility, or
replacing or adjusting one or more units including the parts, and
replacing the facility.

(Supplementary Note 28)

The non-transitory computer readable medium according to Supplementary Note 26 or 27, wherein the processing comprises
determining the repair method for repairing the facility based on an availability of the facility.

(Supplementary Note 29)

The non-transitory computer readable medium according to any one of Supplementary Notes 26 to 28, wherein the processing comprises:
with reference to a storage apparatus that stores information including:
a product manufactured in each line,
a production capacity of the each line, and
a production plan and maintenance plan as the production information, wherein
creating a production plan change proposal that changes the production plan for the line including the failed facility or production plans for the line including the failed facility and one or more another lines, based on
the repair method and the repair time;
at least any one of a production capacity of the line, a progress of a production plan, delivery information, and a maintenance plan; and
the production evaluation indicator,
and presents the production plan change proposal, as the recovery plan with a repair timing.

(Supplementary Note 30)

The non-transitory computer readable medium according to any one of Supplementary Notes 23 to 29, wherein the processing comprises:
presenting a production plan change proposal as the recovery plan, including any one of:
postponing a repair work until a predetermined time without immediately repairing the failed facility;
stopping the line including the failed facility and restart production in the line after repairing the failed facility;
replacing, in the line including the failed facility, the failed facility with a facility of an identical type or similar one and restarting the production in the line;
stopping the line including the failed facility, repairing the facility, and allocating products manufactured in the line to another line; and
configuring a new line, and manufacturing products manufactured in the line including the failed facility in the new line.

(Supplementary Note 31)

The non-transitory computer readable medium according to any one of Supplementary Notes 23 to 30, causing the computer to execute
obtaining a state of the facility and diagnosing a failure of the facility from the state of the facility.

(Supplementary Note 32)

The non-transitory computer readable medium according to Supplementary Note 31, wherein the diagnosing a failure comprises:
predicting an occurrence timing of a failure of the facility based on a degree of deterioration thereof; and
creating the recovery plan based on the prediction of the occurrence timing of the failure of the facility.

(Supplementary Note 33)

The non-transitory computer readable medium according to Supplementary Note 32, wherein the processing comprises:
setting a repair timing for the facility, in a period of time in which a grace period until a maintenance limit time of the facility derived by the failure diagnosis section temporally overlaps with a periodic maintenance.

What is claimed is:
1. A production management system for a plurality of lines, each line including a plurality of facilities for manufacturing a product, the system comprising:
one or more sensors that monitor states of the facilities; and
a production management apparatus that includes:
a processor;

a memory that stores program instructions executable by the processor;

a display apparatus; and a storage that stores production information, the production information including information on the product manufactured on each of one or more of the lines;

information on a production capacity of each of the one or more of the lines;

information on a production plan of the product; and information on a maintenance plan of the facilities, wherein the processor is configured to:

detect a failure of a facility, of the facilities, included in a line, of the lines, based on data obtained from the one or more sensors to obtain failure information of the facility;

determine, based on the failure information on the facility a repair method and a repair time required to repair the facility;

create a production plan change proposal for production of the product that was being produced on the line including the failed facility, in accordance with information on at least one of the production capacity of each line, the maintenance plan of the facilities, progress of the production plan, delivery, and the maintenance plan, and one or more predetermined production evaluation indicators set in advance from among on-time delivery rate, customer importance, man-hours, work hours, labor cost, energy consumption, yield, overall line utilization rate, and quality, the production plan change proposal including information as to whether or not and when to repair the failed facility; and information on at least one of suspension, resumption, or continuation of production on the line including the failed facility, and reallocation of production of the product to an alternative line; and present, on the display apparatus, the production plan change proposal as a recovery plan according to one or more of the predetermined production evaluation indicators.

2. The production management system according to claim 1, wherein the processor is configured to with regard to the recovery plan, re-create another recovery plan adapted to one or more of the production evaluation indicators that a user selects and re-present the another recovery plan re-created on the display apparatus.

3. The production management system according to claim 1, wherein the failure is one that occurs during when the product is manufactured in the line equipped with the facility.

4. The production management system according to claim 1, comprising:

a storage apparatus that stores a failure history of the facility and a repair history including repair content done for the failure and repair time, wherein the processor is configured to determine a repair method and a repair time for the failed facility, based on (A) the failure and repair histories of the facility, (B) the failure and repair histories of one or more of the facilities of a type identical or similar to the failed facility, (C) a result of online diagnosis by a facility manufacturer, or a combination of at least two of (A) to (C) above.

5. The production management system according to claim 4, wherein the repair method includes any one of the following:

replacing or adjusting one or more parts constituting the facility, or replacing or adjusting a unit including the one or more parts, and replacing the facility.

6. The production management system according to claim 4, wherein the processor is configured to determine the repair method for the facility, based on an availability of the facility.

7. The production management system according to claim 1, wherein the processor is configured to present a production plan change proposal as the recovery plan, including any one of:

postponing a repair work until a predetermined time without immediately repairing the failed facility;

stopping the line including the failed facility and restart production in the line after repairing the failed facility;

replacing, in the line including the failed facility, the failed facility with a facility of an identical type or similar one and restarting the production in the line;

stopping the line including the failed facility, repairing the facility, and allocating products manufactured in the line to another line; and configuring a new line, and manufacturing products manufactured in the line including the failed facility in the new line.

8. The production management system according to claim 1, wherein the processor is further configured to:

obtain a state of the facility and diagnose a failure of the facility from the state of the facility.

9. The production management system according to claim 8, wherein the processor is further configured to predict an occurrence timing of a failure of the facility based on a degree of deterioration thereof, and create the recovery plan based on the prediction of the occurrence timing of the failure of the facility.

10. The production management system according to claim 9, wherein the processor is further configured to set a repair timing for the facility, in a period of time in which a grace period from a detection time of a failure sign until a maintenance limit time of the facility temporally overlaps with a periodic maintenance.

11. A computer-based production management method, the method for a system comprising a plurality of lines, each line including a plurality of facilities for manufacturing a product, the method comprising:

storing production information in a storage, the production information including information on the product manufactured on each of one or more of the lines; information on a production capacity of each of the one or more of the lines; information on a production plan of the product and information on a maintenance plan of the facilities;

detecting a failure of a facility, of the facilities, included in a line, of the lines, based on data obtained from one or more sensors that monitor states of the facilities to obtain failure information of the facility;

determining, based on the failure information on the facility a repair method and a repair time required to repair the facility;

creating a production plan change proposal for production of the product that was being produced on the line including the failed facility, in accordance with information on at least one of the production capacity of each line, the maintenance plan of the facilities, progress of the production plan, delivery, and the maintenance plan, and one or more predetermined production evaluation indicators set in advance from among on-time delivery rate, customer importance, man-hours, work hours, labor cost, energy consumption, yield, overall line utilization rate, and quality, the production plan change proposal including information as to whether or not and when to repair the failed facility; and information on at least one of suspension, resumption, or continuation of production on the line including the failed facility, and reallocation of production of the product to an alternative line; and presenting, on a display apparatus, the production plan change proposal as a recovery plan according to one or more of the predetermined production evaluation indicators.

12. The production management method according to claim 11, comprising:

with regard to the recovery plan, re-creating and re-presenting a recovery plan adapted to at least one of the production evaluation indicators selected by a user.

13. The production management method according to claim 11, comprising:

with reference to a storage apparatus that stores a failure history of the facility and a repair history including repair content done for the failure and repair time, determining a repair method and a repair time for the facility, based on (A) the failure and repair histories of the facility, (B) the failure and repair histories of one or more of the facilities of a type identical or similar to the facility, (C) a result of online diagnosis by a facility manufacturer, or a combination of at least two of (A) to (C) above.

14. The production management method according to claim 13, wherein the repair method includes any of the following:

replacing or adjusting one or more parts constituting the facility;

replacing or adjusting one or more units including the parts; and replacing the facility.

15. The production management method according to claim 11, comprising:

presenting a production plan change proposal as the recovery plan, including any one of:

postponing a repair work until a predetermined time without immediately repairing the failed facility;

stopping the line including the failed facility and restart production in the line after repairing the failed facility;

replacing, in the line including the failed facility, the failed facility with a facility of an identical type or similar one and restarting the production in the line;

stopping the line including the failed facility, repairing the facility, and allocating products manufactured in the line to another line; and configuring a new line, and manufacturing products manufactured in the line including the failed facility in the new line.

16. The production management method according to claim 11, comprising:

obtaining a state of the facility to diagnose a failure of the facility from the state of the facility.

17. A non-transitory computer-readable recording medium storing therein a program causing a computer to execute product management processing for a system comprising a plurality of lines, each line including a plurality of facilities for manufacturing a product, the processing comprising:

storing production information in a storage, the production information including information on the product manufactured on each of one or more of the lines; information on a production capacity of each of the one or more of the lines; information on a production plan of the product and information on a maintenance plan of the facilities;

detecting a failure of a facility, of the facilities, included in a line, of the lines, based on data obtained from one or more sensors that monitor states of the facilities to obtain failure information of the facility;

determining, based on the failure information on the facility a repair method and a repair time required to repair the facility;

creating a production plan change proposal for production of the product that was being produced on the line including the failed facility, in accordance with information on at least one of the production capacity of each line, the maintenance plan of the facilities, progress of the production plan, delivery, and the maintenance plan, and one or more predetermined production evaluation indicators set in advance from among on-time delivery rate, customer importance, man-hours, work hours, labor cost, energy consumption, yield, overall line utilization rate, and quality, the production plan change proposal including information as to whether or not and when to repair the failed facility; and information on at least one of suspension, resumption, or continuation of production on the line including the failed facility, and reallocation of production of the product to an alternative line; and presenting, on a display apparatus, the production plan change proposal as a recovery plan according to one or more of the predetermined production evaluation indicators.

18. The non-transitory computer readable medium according to claim 14, wherein the processing comprises:

with regard to the recovery plan, re-creating another recovery plan adapted to one or more of the production evaluation indicators that a user selects and representing the another recovery plan re-created on the display apparatus.

* * * * *